(12) United States Patent
Gunasekara et al.

(10) Patent No.: US 12,505,691 B2
(45) Date of Patent: Dec. 23, 2025

(54) DEEP LEARNING DOCUMENT GENERATION FROM CONVERSATION TRANSCRIPTS

(71) Applicant: International Business Machines Corporation, Armonk, NY (US)

(72) Inventors: Chulaka Gunasekara, New Hyde Park, NY (US); Song Feng, New York, NY (US); Sachindra Joshi, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1051 days.

(21) Appl. No.: 17/493,322

(22) Filed: Oct. 4, 2021

(65) Prior Publication Data

US 2023/0108863 A1  Apr. 6, 2023

(51) Int. Cl.
| | |
|---|---|
| *G06V 30/41* | (2022.01) |
| *G06F 18/23* | (2023.01) |
| *G06N 3/045* | (2023.01) |
| *G06N 3/08* | (2023.01) |
| *G10L 15/26* | (2006.01) |

(52) U.S. Cl.
CPC .............. *G06V 30/41* (2022.01); *G06F 18/23* (2023.01); *G06N 3/045* (2023.01); *G06N 3/08* (2013.01); *G10L 15/26* (2013.01)

(58) Field of Classification Search
None
See application file for complete search history.

(56) References Cited

U.S. PATENT DOCUMENTS

| | | |
|---|---|---|
| 2016/0034426 A1 | 2/2016 | Khanwalkar et al. |
| 2018/0097902 A1 | 4/2018 | Meixner et al. |
| 2019/0028520 A1 | 1/2019 | Nawrocki |

OTHER PUBLICATIONS

Jacquenet, Francois, Marc Bernard, and Christine Largeron. "Meeting summarization, a challenge for deep learning." In International Work—Conference on Artificial Neural Networks, pp. 644-655. Cham: Springer International Publishing, 2019. (Year: 2019).*

(Continued)

*Primary Examiner* — Vincent Gonzales
(74) *Attorney, Agent, or Firm* — Amin, Turocy & Watson, LLP

(57) ABSTRACT

Systems and techniques that facilitate document generation by applying deep learning to conversation transcripts are provided. In various embodiments, a system can comprise a receiver component that can access a set of conversation transcripts. In various aspects, the system can further comprise a document component that can generate, via execution of one or more neural networks, a structured document based on the set of conversation transcripts. More specifically, the document component can generate a set of document chapters by executing a first neural network respectively on the set of conversation transcripts. The document component can further group, via execution of a clustering algorithm, the set of document chapters into one or more clusters of document chapters. The document component can then generate the structured document by executing a second neural network on a first cluster of document chapters from the one or more clusters of document chapters.

20 Claims, 26 Drawing Sheets

(56) References Cited

OTHER PUBLICATIONS

Wang, Peng, Jiaming Xu, Bo Xu, Chenglin Liu, Heng Zhang, Fangyuan Wang, and Hongwei Hao. "Semantic clustering and convolutional neural network for short text categorization." In Proc. of the 53rd Annual Meeting of the Association for Computational Linguistics. pp. 352-57. (Year: 2015).*
Xu, Jiaming, Peng Wang, Guanhua Tian, Bo Xu, Jun Zhao, Fangyuan Wang, and Hongwei Hao. "Short text clustering via convolutional neural networks." In Proceedings of the 1st Workshop on Vector Space Modeling for Natural Language Processing, pp. 62-69. 2015. (Year: 2015).*
Wang, Zhan, Yifan He, and Minghu Jiang. "A comparison among three neural networks for text classification." In 2006 8th international Conference on Signal Processing, vol. 3. IEEE, 2006. (Year: 2006).*
Alami, Nabil, Mohammed Meknassi, Noureddine En-nahnahi, Yassine El Adlouni, and Ouafae Ammor. "Unsupervised neural networks for automatic Arabic text summarization using document clustering and topic modeling." Expert Systems with Applications 172. Jun. 15, 2021. (Year: 2021).*
Kriegel, Hans-Peter, Peer Kröger, Jörg Sander, and Arthur Zimek. "Density-based clustering." Wiley interdisciplinary reviews: data mining and knowledge discovery 1, No. 3 (2011): 231-240. (Year: 2011).*
Misra, Manavendra. "Parallel environments for implementing neural networks." Neural Computing Surveys 1, No. 48-60. 1997. (Year: 1997).*
Mell et al., "The NIST Definition of Cloud Computing," Recommendations of the National Institute of Standards and Technology, NIST Special Publication 800-145, Sep. 2011, 7 pages.
Reiter, E., et al | "Automatic generation of technical documentation". Applied Artificial Intelligence an International Journal, 9(3), 29 pages.
Wiseman, S. et al. | "Challenges in Data-to-Document Generation." In Proceedings of the 2017 Conference on Empirical Methods in Natural Language Processing, 13 pages.
Bihani, A. et al. | "FAQtor: Automatic FAQ generation using online forums." Stanford InfoLab, 2018, 6 pages.
Ajmera, J. et al. | "Automatic generation of question answer pairs from noisy case logs." In 2014 IEEE 30th International Conference on Data Engineering, Mar. 2014, 12 pages.
Zechner, K. et al. | "DIASUMM: Flexible summarization of spontaneous dialogues in unrestricted domains." In COLING 2000 vol. 2: The 18th International Conference on Computational Linguistics, 7 pages.
Yuan, L. et al | "Abstractive dialog summarization with semantic scaffolds." arXiv preprint arXiv:1910.00825, 2019.
Cho, J. et al. | "A Chatbot System for Construction Daily Report Information Management." 36th International Symposium on Automation and Robotics in Construction (ISARC 2019), 9 pages.
Robillard M.P. et al. | "On-demand Developer Documentation," 2017 IEEE International Conference on Software Maintenance and Evolution (ICSME), 2017, doi: 10.1109/ICSME.2017.17, 5 pages.
Rodeghero, P. et al. | "Detecting User Story Information in Developer-Client Conversations to Generate Extractive Summaries.", https://www3.nd.edu/~cmc/papers/rodeghero_icse17.pdf, 11 pages.
Rodeghero, P. | "Behavior-Informed Algorithms for Automatic Documentation Generation." 2017 IEEE International Conference on Software Maintenance and Evolution (ICSME), 2017, pp. 660-664, doi: 10.1109/ICSME.2017.73, 5 pages.
The ip.com | "Method and Technique for automated generation of time based summary reports from various related information sources." Published Sep. 30, 2009. https://priorart.ip.com/IPCOM/000188323, 3 pages.

* cited by examiner

<user> Can I apply zero VAT to this item?
<system> Is it equipment for making 'talking' books and newspapers?
<user> No
<system> Are you selling lifeboats and associated equipment, including fuel?
<user> No
<system> Are you selling medicine or ingredients for medicine?
<user> No
<system> Is it resuscitation training models
<user> Yes
<system> Yes

1802 —
VAT:
You may be able to apply zero to certain equipment that makes 'talking' books and newspapers,' and other medicine or ingredients for medicine.

1804 —
VAT rates:
You may be able to apply zero VAT to an item if it's:
* equipment for making 'talking' books and newspapers
* lifeboats and associated equipment, including fuel
* medicines and ingredients for medicines
* resuscitation training models 1806 —
Items that qualify for the zero rate:
You may be able to apply zero VAT when you sell the following:
* equipment for making 'talking' books and newspapers
* lifeboats and associated equipment, including fuel
* medicine or ingredients for medicine
* resuscitation training models

DEEP LEARNING DOCUMENT GENERATION FROM CONVERSATION TRANSCRIPTS

BACKGROUND

The subject disclosure relates to document generation, and more specifically to facilitating document generation by applying deep learning to conversation transcripts.

Many commercial organizations use documents to help guide customers through various procedures. Such documents are usually generated manually. Unfortunately, such manual generation can be excessively time consuming and expensive. Although some techniques exist for facilitating automated document generation, such techniques rely upon pre-existing text templates or extraction of manually-tagged portions of text. Such techniques are very restrictive, demonstrate poor generalizability, and cannot be implemented without significant human intervention.

Accordingly, systems and/or techniques that can address one or more of the above-described technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate deep learning document generation from conversation transcripts are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can access a set of conversation transcripts. In various aspects, the system can further comprise a document component that can generate, via execution of one or more neural networks, a structured document based on the set of conversation transcripts. More specifically, the document component can generate a set of document chapters by executing a first neural network respectively on the set of conversation transcripts. The document component can further group, via execution of a clustering algorithm, the set of document chapters into one or more clusters of document chapters. The document component can then generate the structured document by executing a second neural network on a first cluster of document chapters from the one or more clusters of document chapters.

According to one or more embodiments, the above-described system can be implemented as a computer-implemented method and/or computer program product.

DESCRIPTION OF THE DRAWINGS

FIGS. 17-18 illustrate non-limiting, example conversation transcripts and document chapters that show significant performance benefits of a chapter-generation neural network due to reinforcement learning improvement.

DETAILED DESCRIPTION

Figure 1:
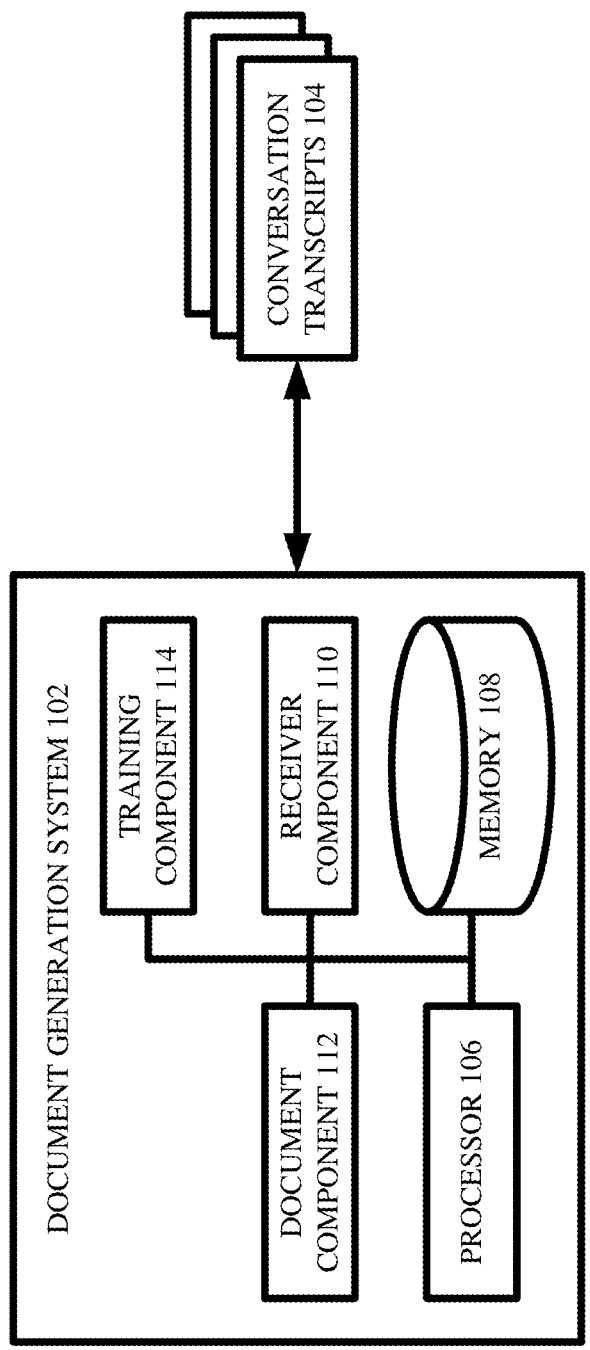
FIG. 1 illustrates a block diagram of an example, non-limiting system that facilitates deep learning document generation from conversation transcripts in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Many commercial organizations utilize text documents to help guide customers through various procedures. For example, a company that manufactures and/or sells a product can provide an instruction manual to customers that purchase the product, where the instruction manual specifies troubleshooting procedures for the product, technical specifications of the product, and/or maintenance instructions for the product. As another example, a governmental authority can provide an instruction manual to citizens, where the instruction manual specifies instructions for performing various civic activities, such as instructions for obtaining a driver license, instructions for obtaining a passport, instructions for registering to vote, instructions for filing a complaint against an entity, and/or instructions for calculating taxable income.

Such text documents are usually generated manually. That is, such text documents are usually typed up by one or more human beings using a word processor. Unfortunately, such manual generation can be excessively time consuming and expensive. Indeed, since such text documents can be upwards of dozens or hundreds of pages in length, manually typing such text documents can require very many man-hours.

Some techniques do exist for facilitating automated generation of text documents. However, such techniques rely upon either pre-existing text templates or extraction of manually-tagged portions of text. More specifically, some automated techniques have a pre-existing text template that includes one or more empty fields, such automated techniques receive inputted text from human users, and such automated techniques insert the inputted text into the one or more empty fields, with the filled-in text template being considered as the finalized text document. Other automated techniques allow human users to manually tag various portions of one or more pre-existing text spans, such automated techniques extract the tagged portions, and such automated techniques collate the tagged portions together, with such collation being considered as the finalized text document. Unfortunately, all of such automated techniques are very restrictive, demonstrate poor generalizability, and cannot be implemented without significant human intervention.

Systems and/or techniques that can address one or more of these technical problems can thus be desirable.

Various embodiments of the invention can address one or more of these technical problems. Specifically, various embodiments of the invention can provide systems and/or techniques that can facilitate deep learning document generation from conversation transcripts. More specifically, the inventors of various embodiments described herein recognized that commercial organizations that utilize text documents to assist customers generally also utilize real-time telephone support to provide supplemental assistance to customers. That is, such customers can engage in spoken/verbal conversations with human agents of the commercial organization, where the human agents answer questions for the customers in real-time and/or otherwise provide spoken/verbal instructions to the customers in real-time (e.g., spoken/verbal instructions for troubleshooting a product, spoken/verbal instructions for maintaining a product, spoken/verbal instructions for performing a procedure). The inventors of various embodiments described herein realized that such spoken/verbal conversations, which are often electronically recorded and/or transcribed, can contain the same substantive information as the text documents of the commercial organization. The inventors of various embodiments of the invention further realized that engaging in such spoken/verbal conversations can require much less effort than manually typing up the text documents. Accordingly, the inventors devised various embodiments described herein, which can automatically generate, via deep learning techniques (e.g., via trained neural networks), such text documents based on transcripts of such spoken/verbal conversations. Because such automated generation of text documents can be facilitated with deep learning, various embodiments described herein do not rely upon and/or otherwise require pre-made text templates with insertion fields or extraction of manually-tagged text spans. Accordingly, various embodiments described herein can be less restrictive and/or more generalizable as compared to existing document generation techniques (e.g., embodiments described herein can be applied regardless of the desired format/structure of the generated text documents and/or regardless of the substantive information that is desired to be conveyed by the generated text documents). Moreover, such embodiments can require no human intervention during inference, in contrast to existing automated document generation techniques (e.g., embodiments described herein can be applied without human users manually tagging desired portions of text during inference time and/or manually formatting desired text templates during inference time).

Various embodiments described herein can be considered as a computerized tool for facilitating deep learning document generation from conversation transcripts. In various aspects, such a computerized tool can comprise a receiver component, a document component, and/or a training component.

In various embodiments, the receiver component of the computerized tool can electronically receive and/or otherwise electronically access a set of conversation transcripts. In various aspects, a conversation transcript can be any suitable electronic written record and/or electronic written log of a spoken and/or verbal conversation. In various instances, the receiver component can electronically retrieve the set of conversation transcripts from any suitable centralized and/or decentralized data structure (e.g., graph data structure, relational data structure, hybrid data structure), whether remote from and/or local to the receiver component. Accordingly, other components of the computerized tool can electronically interact with (e.g., read, write, edit, manipulate) the set of conversation transcripts.

In various embodiments, the document component of the computerized tool can electronically generate one or more structured documents based on the set of conversation transcripts. This is described in more detail below.

In various aspects, the document component can electronically store, maintain, control, and/or otherwise access a chapter-generation neural network. In various instances, the chapter-generation neural network can exhibit any suitable type of deep learning architecture. That is, the chapter-generation neural network can include any suitable number of layers (e.g., input layer, one or more hidden layers, output layer), can include any suitable numbers of neurons in various layers (e.g., different layers can include different numbers of neurons), can include any suitable activation functions in various neurons (e.g., sigmoid, softmax, hyperbolic tangent, rectified linear unit), and/or can include any suitable interneuron connectivity pattern (e.g., forward connections, recurrent connections, skip connections). As a non-limiting example, the chapter-generation neural network can be any suitable sequence-to-sequence ("seq2seq") neural network (e.g., such as a bidirectional and auto-regressive transformer (BART) network) that can be configured to convert an inputted sequence of words into a different and/or transformed sequence of words. As those having ordinary skill in the art will appreciate, a seq2seq neural network can include any suitable permutation of one or more word-embedding layers, one or more long short-term memory (LSTM) layers, one or more gated recurrent unit (GRU) layers, and/or one or more other recurrent neural network (RNN) layers.

In any case, the chapter-generation neural network can be configured and/or trained (e.g., via supervised training, as explained in more detail with respect to the training component) to receive as input a conversation transcript and to produce as output a document chapter that is based on the conversation transcript. In various aspects, the conversation transcript can be considered as an inputted sequence of words (e.g., an inputted span of text) that represents a spoken/verbal conversation, and the document chapter can be considered as an outputted sequence of words (e.g., an outputted span of text) that contains and/or conveys the same substantive information (e.g., the same conversation topics) discussed in the conversation transcript but that is formatted in a more structured, organized, and/or professional fashion as compared to the conversation transcript. For example, since the conversation transcript can be a written record of a spoken/verbal conversation, the conversation transcript can be formatted in a question-and-answer style (e.g., a customer indicates a problem, an agent of the commercial organization asks a question to help solve the problem, the customer replies with an answer, the agent asks another question to help solve the problem, the customer replies with another answer). In contrast, the document chapter can be formatted in a more structured and/or organized style (e.g., the document chapter can include a concise and accurate title, can be written in an if-then format, can be written in an enumerated list format, and/or can include bolded, italicized, and/or underlined text for emphasis). In other words, the document chapter can exhibit the structure, organization, and/or formatting that would normally be expected from the sections and/or chapters of an instruction manual.

In various cases, the document component can electronically execute the chapter-generation neural network on each conversation transcript in the set of conversation transcripts. In various instances, this can yield a set of document chapters that respectively corresponds to the set of conversation transcripts (e.g., one document chapter for each conversation transcript).

In various aspects, the document component can electronically execute a clustering algorithm on the set of document chapters, thereby yielding a set of chapter clusters. In other words, the document component can group together different document chapters in the set of document chapters based on their similarity to each other. As those having ordinary skill in the art will appreciate, the similarity between any two document chapters can be mathematically defined in any suitable fashion, and different clustering techniques can implement different definitions of similarity. As an example, similarity between two document chapters can be defined in terms of the Euclidean distance between the embedded vectors that represent such two document chapters. As another example, similarity between two document chapters can be defined in terms of the Euclidean distances that separate the embedded vectors that represent such two document chapters from some centroid vector. In various instances, any suitable clustering algorithm can be implemented as desired. As some non-limiting examples, the clustering algorithm can be a hierarchical clustering technique such as single-linkage clustering, a centroid-based clustering technique such as k-means clustering or fuzzy c-means clustering, a distribution-based clustering technique such as Gaussian mixture modeling, a density-based clustering technique such as density-based spatial clustering of applications with noise (DBSCAN), and/or any other suitable clustering technique as desired.

In any case, the document component can execute the clustering algorithm on the set of document chapters that are produced by the chapter-generation neural network, with the result of such execution being a set of chapter clusters. In various instances, the set of chapter clusters can include two or more clusters (e.g., two or more subsets) of document chapters, where document chapters that are assigned to the same cluster can be considered as being more similar to each other than document chapters that are assigned to different clusters.

In various aspects, the document component can electronically store, maintain, control, and/or otherwise access a chapter-aggregation neural network. In various instances, the chapter-aggregation neural network can exhibit any suitable type of deep learning architecture. That is, the chapter-aggregation neural network can include any suitable number of layers, can include any suitable numbers of neurons in various layers, can include any suitable activation functions in various neurons, and/or can include any suitable interneuron connectivity pattern. As a non-limiting example, the chapter-aggregation neural network can be any suitable seq2seq neural network (e.g., such as a BART network) that can be configured to convert an inputted sequence of words into a different and/or transformed sequence of words. As mentioned above, those having ordinary skill in the art will appreciate that a seq2seq neural network can include one or more word-embedding layers, one or more LSTM layers, one or more GRU layers, and/or one or more other RNN layers.

In any case, the chapter-aggregation neural network can be configured and/or trained (e.g., via supervised training, as explained in more detail with respect to the training component) to receive as input a cluster of document chapters and to produce as output a structured document that is based on the cluster of document chapters. In various aspects, the cluster of document chapters can be considered as an inputted sequence of words (e.g., an inputted span of text), and the structured document can be considered as an outputted sequence of words (e.g., an outputted span of text) that contains and/or conveys the same substantive information discussed in the cluster of document chapters but that is formatted as a finalized, end-user-facing instruction manual. For example, as mentioned above, each document chapter can be formatted in a structured and/or organized style (e.g., the document chapter can include a concise and accurate title, can be written in an if-then format, can be written in an enumerated list format, and/or can include bolded, italicized, and/or underlined text for emphasis). In contrast, the structured document can be an aggregation of the cluster of document chapters that is formatted as a finalized instruction manual (e.g., can include each document chapter in the cluster, can include a title page, can include a table of contents, can include an index, can include page numbers).

In various cases, the document component can electronically execute the chapter-aggregation neural network on each chapter cluster in the set of chapter clusters. In various instances, this can yield a set of structured documents that respectively correspond to the set of chapter clusters (e.g., one structured document for each cluster of document chapters).

In other words, the computerized tool described herein can: receive as input a set of conversation transcripts; execute a chapter-generation neural network on each of the set of conversation transcripts, thereby yielding a set of document chapters; execute a clustering algorithm on the set of document chapters, thereby yielding a set of chapter clusters; and execute a chapter-aggregation neural network on each of the set of chapter clusters, thereby yielding a set of finalized and/or structured documents. Note that the computerized tool does not require pre-made templates during inference and/or manual-tagging during inference.

In some embodiments, the computerized tool can further comprise an execution component. In various aspects, the execution component can take any suitable type of computerized action once the set of structured documents has been outputted by the document component. For example, in some cases, the execution component can electronically transmit the set of structured documents to any suitable computing devices. As another example, the execution component can execute an ink printer, so as to physically print out the set of structured documents.

In order to facilitate the above-described functionalities, the chapter-generation neural network and the chapter-aggregation neural network must first be trained. In various aspects, the training component of the computerized tool can facilitate such training, as described below. Those having ordinary skill in the art will appreciate that, because clustering algorithms are generally iterative and unsupervised, such clustering algorithms can, in various cases, be facilitated without training.

In various embodiments, the receiver component can electronically receive, retrieve, and/or otherwise access, from any suitable data structure, a chapter-generation training dataset, and the training component of the computerized tool can electronically train the chapter-generation neural network on the chapter-generation training dataset.

In various aspects, the chapter-generation training dataset can include a set of training conversation transcripts and a respectively corresponding set of document chapter annotations. In other words, each unique training conversation transcript can correspond to a unique document chapter annotation, where the unique document chapter annotation can be considered as the known ground-truth result that should be obtained when chapter-generation is successfully and/or accurately applied to the unique training conversation transcript.

In various instances, the training component can train the chapter-generation neural network as follows. In various cases, the internal parameters (e.g., weight matrices, bias values) of the chapter-generation neural network can be randomly initialized. In various aspects, the training component can select a training conversation transcript from the chapter-generation training dataset, and the training component can identify in the chapter-generation training dataset a ground-truth document chapter annotation that corresponds to the selected training conversation transcript. In various instances, the training component can feed the selected training conversation transcript as input to the chapter-generation neural network. In various cases, the selected training conversation transcript can complete a forward pass through the layers of the chapter-generation neural network (e.g., through the embedding layers, LSTM layers, GRU layers, and/or RNN layers) according to the interneuron connections (e.g., forward connections, recurrent connections, skip connections) that are implemented in the chapter-generation neural network. Such forward pass can cause a final layer (e.g., an output layer) of the chapter-generation neural network to generate a sequence of text as output, where such output can be considered as the estimated and/or inferred document chapter that the chapter-generation neural network believes should correspond to the selected training conversation transcript. If the chapter-generation neural network has so far undergone no and/or little training, such output can be very inaccurate (e.g., such output can appear to be gibberish if no and/or little training has been completed). In various aspects, the training component can compute an error/loss between such output and the ground-truth document chapter annotation that corresponds to the selected training conversation transcript. As those having ordinary skill in the art will appreciate, any suitable error/loss function can be implemented (e.g., cross-entropy error between embedded vectors). In various instances, the training component can update the internal parameters of the chapter-generation neural network by performing back-propagation based on the computed error/loss. In various cases, the training component can repeat this procedure for each of the training conversation transcripts in the chapter-generation training dataset, with the ultimate result being that the internal parameters of the chapter-generation neural network become iteratively optimized to accurately infer document chapters based on inputted conversation transcripts. Those having ordinary skill in the art will appreciate that any suitable batch sizes, any suitable number of training epochs, and/or any suitable training termination criteria can be implemented in various embodiments.

To further improve the performance of the chapter-generation neural network, the training component can implement a type of reinforcement learning with the help of a conversation-generation neural network. More specifically, in various embodiments, the training component can electronically store, maintain, control, and/or otherwise access a conversation-generation neural network. In various instances, the conversation-generation neural network can exhibit any suitable type of deep learning architecture. That is, the conversation-generation neural network can include any suitable number of layers, can include any suitable numbers of neurons in various layers, can include any suitable activation functions in various neurons, and/or can include any suitable interneuron connectivity pattern. As a non-limiting example, the conversation-generation neural network can be any suitable seq2seq neural network (e.g., such as a BART network) that can be configured to convert an inputted sequence of words into a different and/or transformed sequence of words. As mentioned above, those having ordinary skill in the art will appreciate that a seq2seq neural network can include, in any suitable order, any suitable combination of word-embedding layers, LSTM layers, GRU layers, and/or other RNN layers.

In any case, the conversation-generation neural network can be configured and/or trained (e.g., via supervised training, as explained shortly below) to receive as input a document chapter and to produce as output a conversation transcript based on the document chapter. In other words, the conversation-generation neural network can be considered as performing the inverse of the transformation which the chapter-generation neural network performs: the chapter-generation neural network can generate document chapters based on inputted conversation transcripts, whereas the conversation-generation neural network can generate conversation transcripts based on inputted document chapters.

In various instances, the training component can train the conversation-generation neural network on the chapter-generation training dataset as follows. In various cases, the internal parameters (e.g., weight matrices, bias values) of the conversation-generation neural network can be randomly initialized. In various aspects, the training component can select a training conversation transcript from the chapter-generation training dataset, and the training component can identify in the chapter-generation training dataset a ground-truth document chapter annotation that corresponds to the selected training conversation transcript. In various instances, the training component can feed the ground-truth document chapter annotation (instead of the selected training conversation transcript) as input to the conversation-generation neural network. In various cases, the ground-truth document chapter annotation can complete a forward pass through the layers of the conversation-generation neural network according to the interneuron connections that are implemented in the conversation-generation neural network. Such forward pass can cause a final layer of the conversation-generation neural network to generate a sequence of text as output, where such output can be considered as the estimated and/or inferred conversation transcript that the conversation-generation neural network believes should correspond to the ground-truth document chapter annotation. If the conversation-generation neural network has so far undergone no and/or little training, such output can be very inaccurate (e.g., such output can look like gibberish). In various aspects, the training component can compute an error/loss between such output and the selected training conversation transcript that corresponds to the ground-truth document chapter annotation. As those having ordinary skill in the art will appreciate, any suitable error/loss function can be implemented (e.g., cross-entropy error). In various instances, the training component can update the internal parameters of the conversation-generation neural network by performing backpropagation based on the computed error/loss. In various cases, the training component can repeat this procedure for each of the training conversation transcripts in the chapter-generation training dataset, with the ultimate result being that the internal parameters of the conversation-generation neural network become iteratively optimized to accurately infer conversation transcripts based on inputted document chapters. Those having ordinary skill in the art will appreciate that any suitable batch sizes, any suitable number of training epochs, and/or any suitable training termination criteria can be implemented in various embodiments.

Once both the chapter-generation neural network and the conversation-generation neural network have been trained as described above, the training component can further improve the performance of the chapter-generation neural network by leveraging the conversation-generation neural network.

More specifically, the training component can select a training conversation transcript from the chapter-generation training dataset. In various aspects, the training component can feed the selected training conversation transcript as input to the chapter-generation neural network. The selected training conversation transcript can complete a forward pass through the layers of the chapter-generation neural network, which can cause the final layer of the chapter-generation neural network to output an estimated document chapter. In various cases, the estimated document chapter can be considered as the document chapter that the chapter-generation neural network believes should correspond to the selected training conversation transcript. In various instances, the training component can feed the estimated document chapter as input to the conversation-generation neural network. The estimated document chapter can complete a forward pass through the layers of the conversation-generation neural network, which can cause the final layer of the conversation-generation neural network to output an estimated conversation transcript. In various cases, the estimated conversation transcript can be considered as the conversation transcript that the conversation-generation neural network believes should correspond to the estimated document chapter.

Note that, if the estimated document chapter is more correct/accurate, a similarity (e.g., cosine similarity, reciprocal of Euclidean distance) between the estimated conversation transcript and the selected training conversation transcript can be higher. On the other hand, if the estimated document chapter is less correct/accurate, a similarity between the estimated conversation transcript and the selected training conversation transcript can be lower. Accordingly, in various aspects, the training component can compute an error/loss between the estimated conversation transcript and the selected training conversation transcript, and the training component can treat such error/loss as a reinforcement learning reward/punishment.

More specifically, the training component can electronically access a parameter-perturbation policy. In various cases, the parameter-perturbation policy can be any suitable mapping of internal parameter states (e.g., weight matrix values, bias values) of the chapter-generation neural network to internal parameter updates that are to be performed on the chapter-generation neural network. In other words, the parameter-perturbation policy can specify how the internal parameters of the chapter-generation neural network should be updated/changed, when given the current values of the internal parameters of the chapter-generation neural network. In various aspects, the parameter-perturbation policy can have any suitable initialization (e.g., can be a randomly-initialized policy). In various instances, once the training component has computed the error/loss between the estimated conversation transcript and the selected training conversation transcript, the training component can update, via any suitable reinforcement learning technique (e.g., dynamic programming, Q-learning, deep Q-learning, proximal policy optimization), the parameter-perturbation policy based on such error/loss. Once the training component has updated the parameter-perturbation policy based on the error/loss, the training component can implement the updated parameter-perturbation policy on the chapter-generation neural network. In other words, the updated parameter-perturbation policy can specify an update/change to be made to the values of the internal parameters of the chapter-generation neural network, based on the current values of the internal parameters of the chapter-generation neural network. So, the training component can perform such specified update/change on the internal parameters of the chapter-generation neural network.

In various cases, the training component can repeat this procedure for each of the training conversation transcripts in the chapter-generation training dataset. By repeating this procedure for each of the training conversation transcripts in the chapter-generation training dataset, the reinforcement learning technique that is implemented by the training component can cause the parameter-perturbation policy to become optimized, which can correspondingly cause the error/loss between the estimated conversation transcript and the selected training conversation transcript to become minimized. Ultimately, this means that the chapter-generation neural network can have achieved improved performance.

In various embodiments, the receiver component can electronically receive, retrieve, and/or otherwise access, from any suitable data structure, a chapter-aggregation training dataset, and the training component of the computerized tool can electronically train the chapter-aggregation neural network on the chapter-aggregation training dataset.

In various aspects, the chapter-aggregation training dataset can include a set of training chapter clusters and a respectively corresponding set of structured document annotations. In other words, each unique training chapter cluster can correspond to a unique structured document annotation, where the unique structured document annotation can be considered as the known ground-truth result that should be obtained when chapter-aggregation is successfully and/or accurately applied to the unique training chapter cluster.

In various instances, the training component can train the chapter-aggregation neural network as follows. In various cases, the internal parameters (e.g., weight matrices, bias values) of the chapter-aggregation neural network can be randomly initialized. In various aspects, the training component can select a training chapter cluster from the chapter-aggregation training dataset, and the training component can identify in the chapter-aggregation training dataset a ground-truth structured document annotation that corresponds to the selected training chapter cluster. In various instances, the training component can feed the selected training chapter cluster as input to the chapter-aggregation neural network. In various cases, the selected training chapter cluster can complete a forward pass through the layers of the chapter-aggregation neural network according to the interneuron connections that are implemented in the chapter-aggregation neural network. Such forward pass can cause a final layer of the chapter-aggregation neural network to generate a sequence of text as output, where such output can be considered as the estimated and/or inferred structured document that the chapter-aggregation neural network believes should correspond to the selected training chapter cluster. If the chapter-aggregation neural network has so far undergone no and/or little training, such output can be very inaccurate (e.g., such output can look like gibberish). In various aspects, the training component can compute an error/loss between such output and the ground-truth structured document annotation that corresponds to the selected training chapter cluster. As those having ordinary skill in the art will appreciate, any suitable error/loss function can be implemented (e.g., cross-entropy error). In various instances, the training component can update the internal parameters of the chapter-aggregation neural network by performing back-propagation based on the computed error/loss. In various cases, the training component can repeat this procedure for each of the training chapter clusters in the chapter-aggregation training dataset, with the ultimate result being that the internal parameters of the chapter-aggregation neural network become iteratively optimized to accurately infer structured/finalized documents based on inputted clusters of document chapters. Those having ordinary skill in the art will appreciate that any suitable batch sizes, any suitable number of training epochs, and/or any suitable training termination criteria can be implemented in various embodiments.

Accordingly, various embodiments described herein include a computerized tool that can leverage one or more trained neural networks (e.g., deep learning models) to automatically transform a set of conversation transcripts into a set of structured documents (e.g., into a set of organized and/or formatted instruction manuals).

Various embodiments of the invention can be employed to use hardware and/or software to solve problems that are highly technical in nature (e.g., to facilitate deep learning document generation from conversation transcripts), that are not abstract and that cannot be performed as a set of mental acts by a human. Further, some of the processes performed can be performed by a specialized computer (e.g., chapter-generation neural network, clustering algorithm, chapter-aggregation neural network). In various aspects, some defined tasks associated with various embodiments of the invention can include: accessing a set of conversation transcripts; executing a first neural network on each of the set of conversation transcripts, thereby yielding a set of document chapters; executing a clustering algorithm on the set of document chapters, thereby yielding a set of chapter clusters; and executing a second neural network on each of the set of chapter clusters, thereby yielding a set of structured/finalized documents. Moreover, such defined tasks can further include performing supervised training (e.g., via backpropagation) on the first and/or second neural networks.

Neither the human mind nor a human with pen and paper can electronically receive conversation transcripts, electronically generate document chapters by executing a first neural network on the conversation transcripts, electronically cluster the document chapters by executing a clustering algorithm, electronically generate structured/finalized documents by executing a second neural network on the clusters of document chapters, and/or electronically train the first and second neural networks via backpropagation. Indeed, neural networks are specific combinations of computer-executable hardware and computer-executable software that cannot be executed and/or trained in any sensible, practical, and/or reasonable way outside of a computing environment.

In various instances, one or more embodiments described herein can be integrated into a practical application. Indeed, as described herein, various embodiments of the invention, which can take the form of systems and/or computer-implemented methods, can be considered as a computerized tool that can electronically generate structured/finalized documents (e.g., instruction manuals having title pages, abstracts, tables of contents, and/or indexes) by executing trained neural networks on transcripts of spoken/verbal conversations. With such a computerized tool, manual writing/typing of such structured/finalized documents can be no longer necessary. Moreover, because such a computerized tool utilizes deep learning (e.g., trained neural networks), such a computerized tool can function without relying upon pre-made text templates during inference time and without relying upon manually-tagged text during inference time. Furthermore, such a computerized tool can be applied regardless of the substantive information contained within the conversation transcripts (e.g., regardless of the conversation topics that are discussed in the transcripts) and regardless of the formatting that is desired to be exhibited by the outputted structured documents, meaning that such a computerized tool is very generalizable. For at least these reasons, such a computerized tool certainly constitutes a useful and practical application of computers.

It should be appreciated that the figures and the herein disclosure describe non-limiting examples of various embodiments of the invention.

FIG. 1 illustrates a block diagram of an example, non-limiting system 100 that can facilitate deep learning document generation from conversation transcripts in accordance with one or more embodiments described herein.

As shown, a document generation system 102 can be electronically integrated, via any suitable wired and/or wireless electronic connection, with a set of conversation transcripts 104. In various aspects, the set of conversation transcripts 104 can comprise any suitable number of conversation transcripts. In various instances, a conversation transcript can be any suitable written and/or textual electronic record of a spoken and/or verbal conversation between two or more entities, where such spoken and/or verbal conversation can pertain to any suitable topics and/or substantive information. In other words, the conversation transcript can include statements made by and/or questions asked by the two or more entities during the spoken/verbal conversation, and such statements and/or questions can contain and/or otherwise pertain to any suitable information/topics. As some non-limiting examples, the statements and/or questions can pertain to maintenance instructions for a product, troubleshooting instructions for a product, and/or instructions for performing a procedure.

In various cases, it can be desired to automatically generate one or more structured documents (e.g., one or more finalized instruction manuals) based on the set of conversation transcripts 104. In various instances, the document generation system 102 can facilitate such functionality.

In various embodiments, the document generation system 102 can comprise a processor 106 (e.g., computer processing unit, microprocessor) and a computer-readable memory 108 that is operably connected to the processor 106. The memory 108 can store computer-executable instructions which, upon execution by the processor 106, can cause the processor 106 and/or other components of the document generation system 102 (e.g., receiver component 110, document component 112, training component 114) to perform one or more acts. In various embodiments, the memory 108 can store computer-executable components (e.g., receiver component 110, document component 112, training component 114), and the processor 106 can execute the computer-executable components.

In various embodiments, the document generation system 102 can comprise a document component 112. In various aspects, the document component 112 can electronically generate a set of structured documents based on the set of conversation transcripts 104. More specifically, the document component 112 can electronically execute a chapter-generation neural network on each of the set of conversation transcripts 104, thereby outputting a set of document chapters. In various instances, the document component 112 can electronically execute a clustering algorithm on the set of document chapters, thereby outputting a set of chapter clusters that are collated according to similarity. In various cases, the document component 112 can electronically execute a chapter-aggregation neural network on each of the set of chapter clusters, thereby outputting a set of structured/finalized documents.

In various embodiments, the training component 114 can electronically train the chapter-generation neural network and the chapter-aggregation neural network, so as to facilitate the herein-described functionality.

Figure 2:
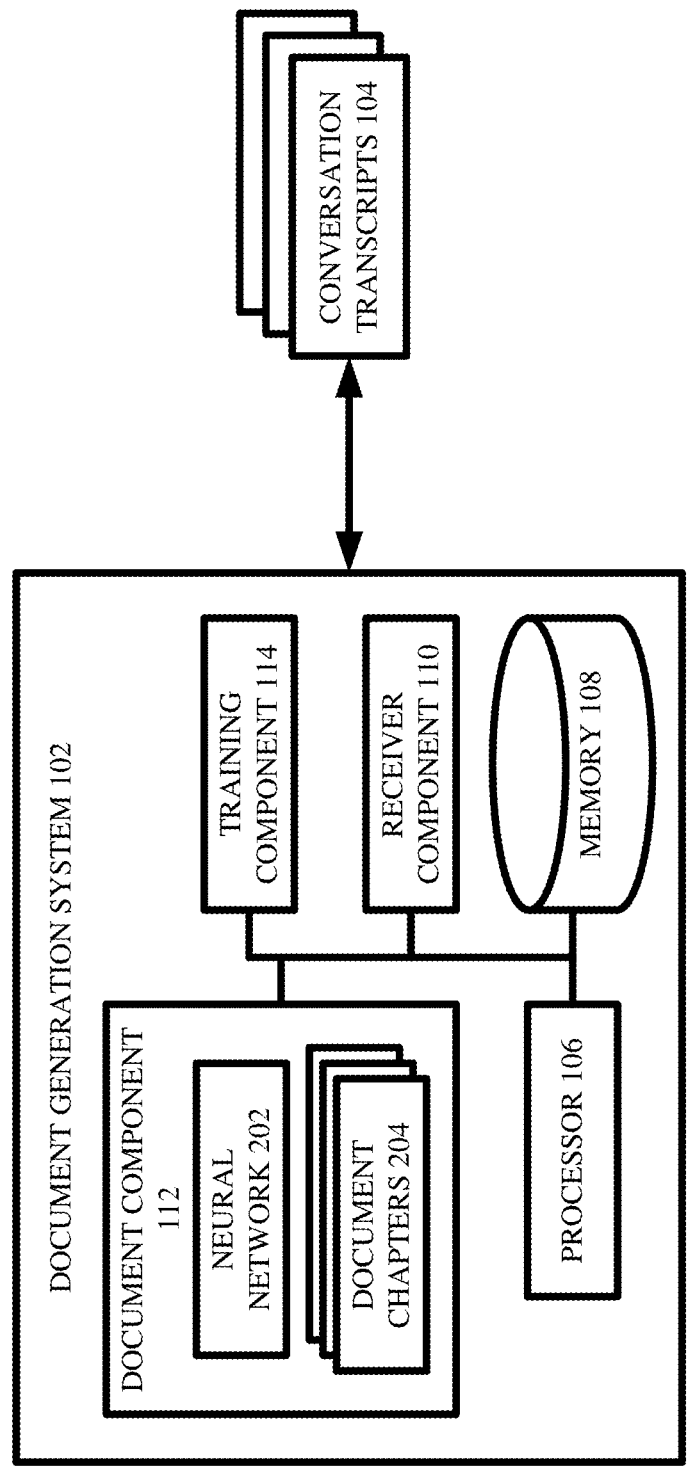
FIG. 2 illustrates a block diagram of an example, non-limiting system including a chapter-generation neural network that facilitates deep learning document generation from conversation transcripts in accordance with one or more embodiments described herein.

FIG. 2 illustrates a block diagram of an example, non-limiting system 200 including a chapter-generation neural network that can facilitate deep learning document generation from conversation transcripts in accordance with one or more embodiments described herein. As shown, the system 200 can, in some cases, comprise the same components as the system 100, and can further comprise a neural network 202 and a set of document chapters 204.

In various embodiments, the document component 112 can electronically store, electronically maintain, electronically control, and/or otherwise electronically access the neural network 202. In various aspects, the neural network 202 can exhibit any suitable deep learning architecture. For instance, the neural network 202 can comprise any suitable number of layers, such as an input layer, one or more hidden layers, and/or an output layer. Moreover, the neural network 202 can comprise any suitable numbers of neurons in various layers, such that different layers can have the same and/or different numbers of neurons as each other. Furthermore, the neural network 202 can comprise any suitable activation functions in various neurons, such as softmax, sigmoid, hyperbolic tangent, and/or rectified linear unit. Further still, the neural network 202 can comprise any suitable interneuron connections, such as forward connections, recurrent connections, and/or skip connections. As a non-limiting example, the neural network 202 can be a seq2seq network that comprises any suitable embedding layers (e.g., layers that receive text tokens as input and that produce as output numerical vectors representing such text tokens, and/or vice versa) and/or any suitable recurrent layers (e.g., such as LSTM layers and/or GRU layers). In any case, the neural network 202 can be configured to receive as input a given sequence of text tokens (e.g., a given sequence of words) and to produce as output a different and/or transformed sequence of text tokens (e.g., a different and/or transformed sequence of words).

In various aspects, the neural network 202 can be trained (e.g., by the training component 114, as described in detail with respect to FIGS. 11-18) to receive as input a conversation transcript and to produce as output a document chapter based on the inputted conversation transcript. Accordingly, in various instances, the document component 112 can electronically execute the neural network 202 on each of the set of conversation transcripts 104, thereby resulting in the set of document chapters 204. This is further explained with respect to FIGS. 3-4.

Figure 3:
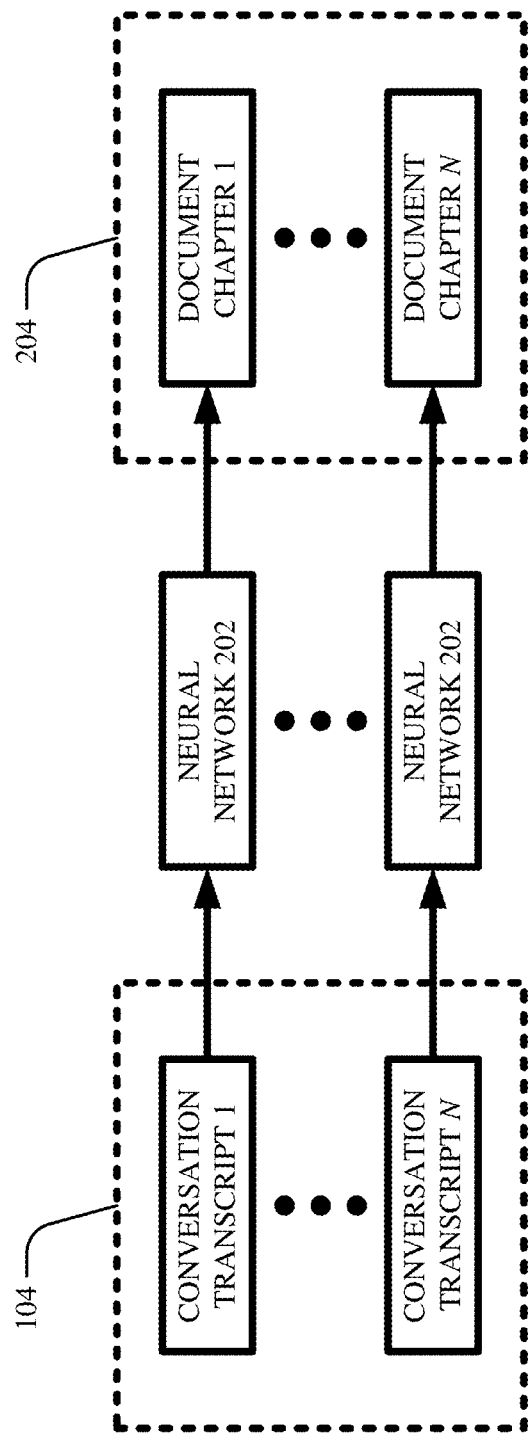
FIGS. 3-4 illustrate non-limiting, example block diagrams showing how a chapter-generation neural network can generate document chapters from conversation transcripts in accordance with one or more embodiments described herein.
Figure 4:
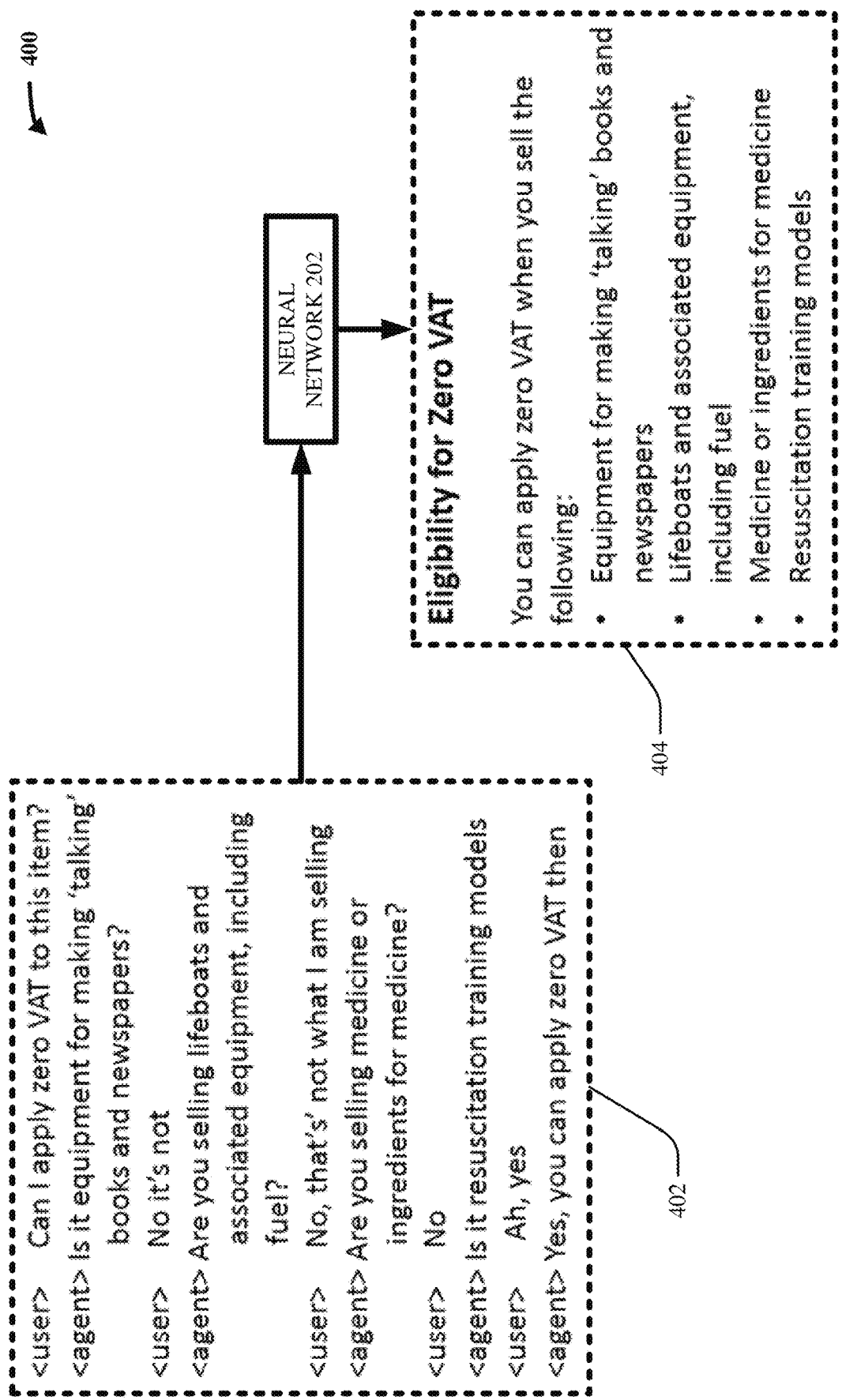

FIGS. 3-4 illustrate non-limiting, example block diagrams 300-400 showing how the neural network 202 can generate the set of document chapters 204 from the set of conversation transcripts 104 in accordance with one or more embodiments described herein.

As shown in FIG. 3, the set of conversation transcripts 104 can comprise n conversation transcripts, for any suitable positive integer n: a conversation transcript 1 to a conversation transcript n. As also shown, the set of document chapters 204 can comprise n document chapters: a document chapter 1 to a document chapter n. Thus, the set of document chapters 204 can be considered as respectively corresponding to the set of conversation transcripts 104.

In various aspects, the document component 112 can generate the set of document chapters 204 by executing the neural network 202 on each of the set of conversation transcripts 104. For example, as shown, the document component 112 can feed the conversation transcript 1 as input to the neural network 202, and the neural network 202 can generate as output the document chapter 1 based on the conversation transcript 1. More specifically, the conversation transcript 1 can be a sequence of text tokens, and the document component 112 can feed such sequence of text tokens to an input embedding layer of the neural network 202. As those having ordinary skill in the art will appreciate, the input embedding layer can convert, via any suitable word embedding technique and/or word embedding paradigm, the conversation transcript 1 into one or more scalars, vectors, matrices, and/or tensors. In various cases, such one or more scalars, vectors, matrices, and/or tensors can complete a forward pass through the internal layers (e.g., LSTM layers, GRU layers, RNN layers, other embedding layers) of the neural network 202, according to the interneuron connections (e.g., forward connections, recurrent connections, skip connections) that are implemented in the neural network 202. That is, activation of the internal layers can transform the one or more scalars, vectors, matrices, and/or tensors into one or more transformed scalars, vectors, matrices, and/or tensors. Finally, in various aspects, an output embedding layer of the neural network 202 can convert, via any suitable word embedding technique and/or word embedding paradigm, the one or more transformed scalars, vectors, matrices, and/or tensors into a resultant sequence of text tokens. In various cases, the resultant sequence of text tokens can be considered as the document chapter 1. In various aspects, the document chapter 1 can be a span of text that contains and/or conveys the same substantive information as the conversation transcript 1 but that is formatted/structured in a more organized and/or professional manner as compared to the conversation transcript 1. For example, the conversation transcript 1 can be in a question-and-answer format and/or can include small talk, whereas the document chapter 1 can exclude small talk, can include a title, can be written in an enumerated list and/or if-then format, and/or can include bolded, italicized, and/or underlined text for emphasis. Moreover, because the neural network 202 is a deep learning model as opposed to a merely extractive model, the document chapter 1 can include words and/or symbols that are not found in the conversation transcript 1.

As another example, as shown, the document component 112 can feed the conversation transcript n as input to the neural network 202, and the neural network 202 can generate as output the document chapter n based on the conversation transcript n. More specifically, the conversation transcript n can be a sequence of text tokens, and the document component 112 can feed such sequence of text tokens to the input embedding layer of the neural network 202. As above, the input embedding layer can convert, via any suitable word embedding technique and/or word embedding paradigm, the conversation transcript n into one or more scalars, vectors, matrices, and/or tensors. In various cases, such one or more scalars, vectors, matrices, and/or tensors can complete a forward pass through the internal layers of the neural network 202, according to the interneuron connections that are implemented in the neural network 202. That is, activation of the internal layers can transform the one or more scalars, vectors, matrices, and/or tensors into one or more transformed scalars, vectors, matrices, and/or tensors. Finally, in various aspects, the output embedding layer of the neural network 202 can convert, via any suitable word embedding technique and/or word embedding paradigm, the one or more transformed scalars, vectors, matrices, and/or tensors into a resultant sequence of text tokens. In various cases, the resultant sequence of text tokens can be considered as the document chapter n. In various aspects, the document chapter n can be a span of text that contains and/or conveys the same substantive information as the conversation transcript n but that is formatted/structured in a more organized and/or professional manner as compared to the conversation transcript n. For instance, the conversation transcript n can be in a question-and-answer format and/or can include small talk, whereas the document chapter n can exclude small talk, can include a title, can be written in an enumerated list and/or if-then format, and/or can include bolded, italicized, and/or underlined text for emphasis. Moreover, because the neural network 202 is a deep learning model as opposed to a merely extractive model, the document chapter n can include words and/or symbols that are not found in the conversation transcript n.

FIG. 4 illustrates a non-limiting example of real-world inputs and/or outputs of a non-limiting reduced-to-practice embodiment of the neural network 202. As shown, the neural network 202 can, in some cases, receive as input a conversation transcript 402, and the neural network 202 can produce as output a document chapter 404 based on the conversation transcript 402. As can be seen, the conversation transcript 402 can be a span of text that is written in a question-and-answer format. In this non-limiting example, a user indicates a problem to be solved (e.g., whether zero value-added taxation (VAT) can be applied to an item), an agent of the organization at issue asks a series of questions to help solve the problem (e.g., whether the item is for making "talking" books or newspapers, whether the item is a lifeboat, whether the item is a medicine), and the user answers each question in turn. On the other hand, as shown, the document chapter 404 can be a span of text that contains the same substantive information as the conversation transcript 402 (e.g., specifies what types of items are eligible for zero VAT) but that can be organized in a more structured and/or professional manner (e.g., includes a bolded and descriptive title regarding zero VAT, includes an enumerated list of items that qualify for zero VAT). Upon visual inspection, it can be seen that the document chapter 404 is structured and/or organized as if it were a section, part, and/or chapter of a finalized instruction manual, in contrast to the conversation transcript 402 which is structured and/or organized as a verbatim record of a spoken/verbal conversation.

Figure 5:
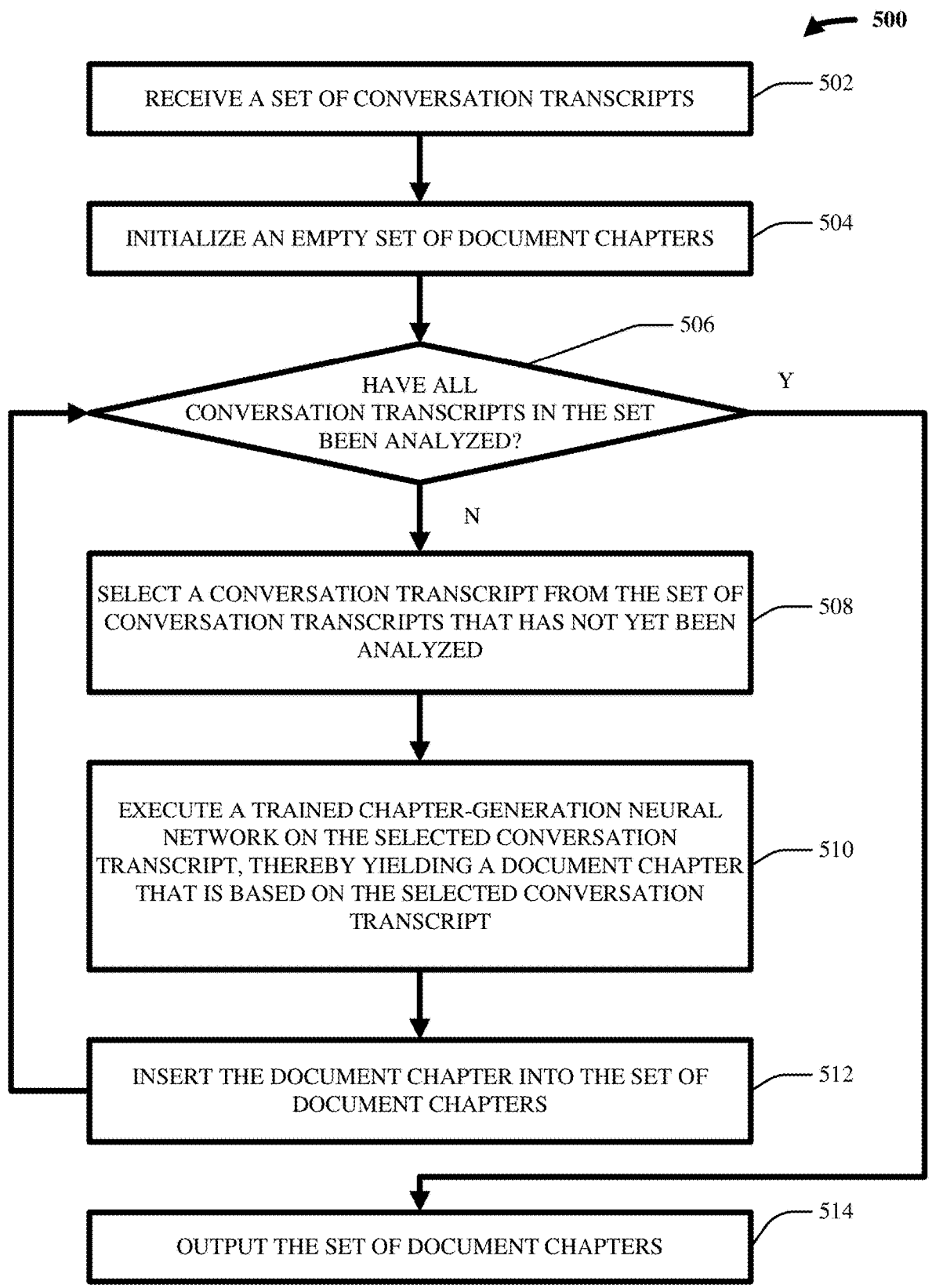
FIG. 5 illustrates a flow diagram of an example, non-limiting computer-implemented method that facilitates deep learning document generation from conversation transcripts in accordance with one or more embodiments described herein.

FIG. 5 illustrates a flow diagram of an example, non-limiting computer-implemented method 500 that can facilitate deep learning document generation from conversation transcripts in accordance with one or more embodiments described herein. In various cases, the document generation system 102 can facilitate the computer-implemented method 500.

In various embodiments, act 502 can include receiving, by a device (e.g., 110) operatively coupled to a processor, a set of conversation transcripts (e.g., 104).

In various aspects, act 504 can include initializing, by the device (e.g., 112), an empty set of document chapters.

In various instances, act 506 can include determining, by the device (e.g., 112), whether all conversation transcripts in the set of conversation transcripts have been analyzed by the device. If not, the computer-implemented method 500 can proceed to act 508. If so, the computer-implemented method 500 can proceed to act 514.

In various cases, act 508 can include selecting, by the device (e.g., 112), a conversation transcript (e.g., one of 104) from the set of conversation transcripts that has not yet been analyzed by the device.

In various aspects, act 510 can include executing, by the device (e.g., 112), a trained chapter-generation neural network (e.g., 202) on the selected conversation transcript, thereby yielding a document chapter (e.g., one of 204) that is based on the selected conversation transcript.

In various instances, act 512 can include inserting, by the device (e.g., 112), the document chapter into the set of document chapters. In various cases, the computer-implemented method 500 can proceed back to act 506.

In various aspects, act 514 can include outputting, by the device (e.g., 112), the set of document chapters (e.g., 204).

Figure 6:
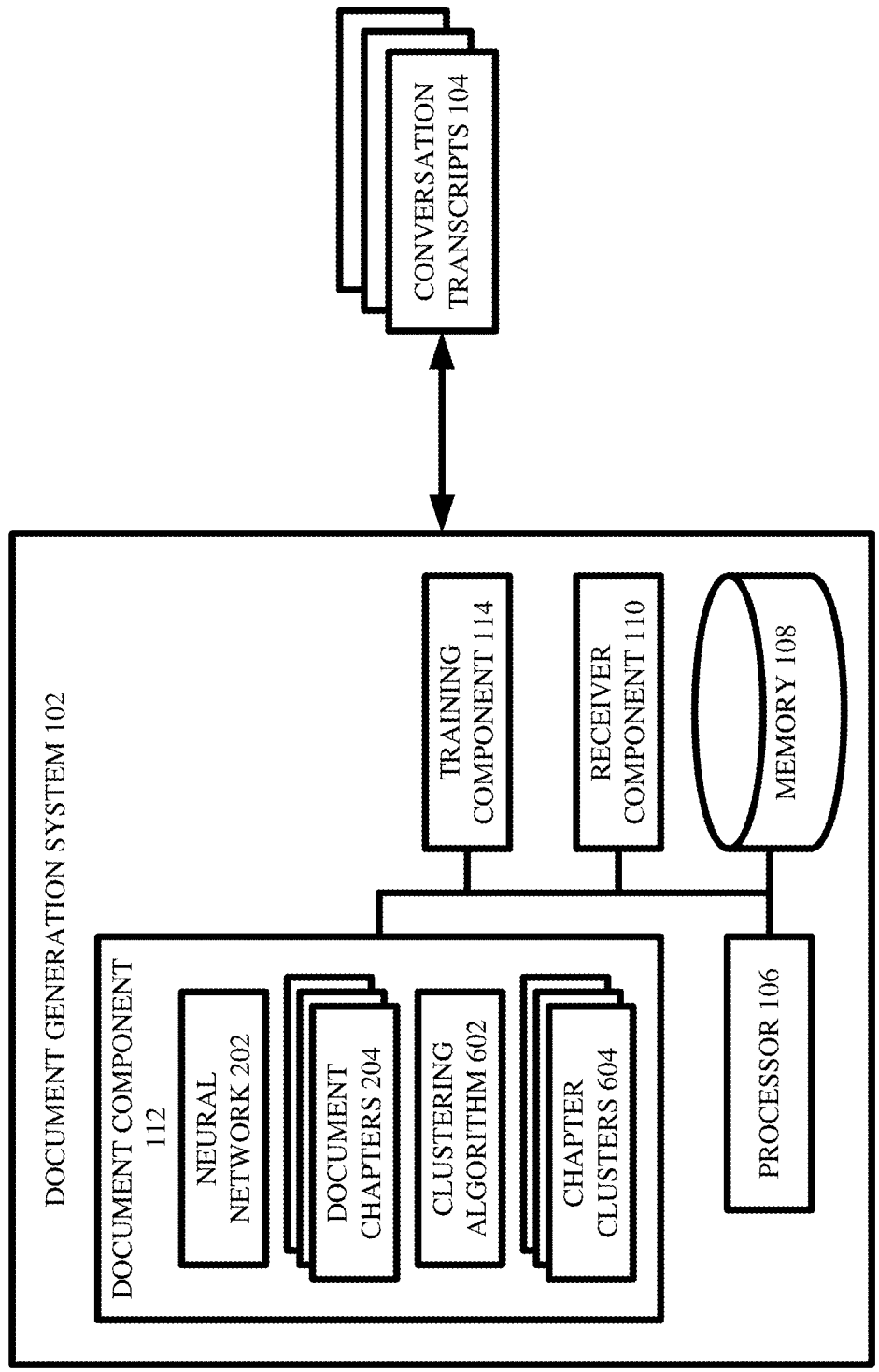
FIG. 6 illustrates a block diagram of an example, non-limiting system including a clustering algorithm that facilitates deep learning document generation from conversation transcripts in accordance with one or more embodiments described herein.

FIG. 6 illustrates a block diagram of an example, non-limiting system 600 including a clustering algorithm that can facilitate deep learning document generation from conversation transcripts in accordance with one or more embodiments described herein. As shown, the system 600 can, in some cases, comprise the same components as the system 200, and can further comprise a clustering algorithm 602 and/or a set of chapter clusters 604.

In various embodiments, the document component 112 can electronically execute and/or otherwise apply the clustering algorithm 602 to the set of document chapters 204, thereby yielding the set of chapter clusters 604. This is explained in more detail with respect to FIG. 7.

Figure 7:
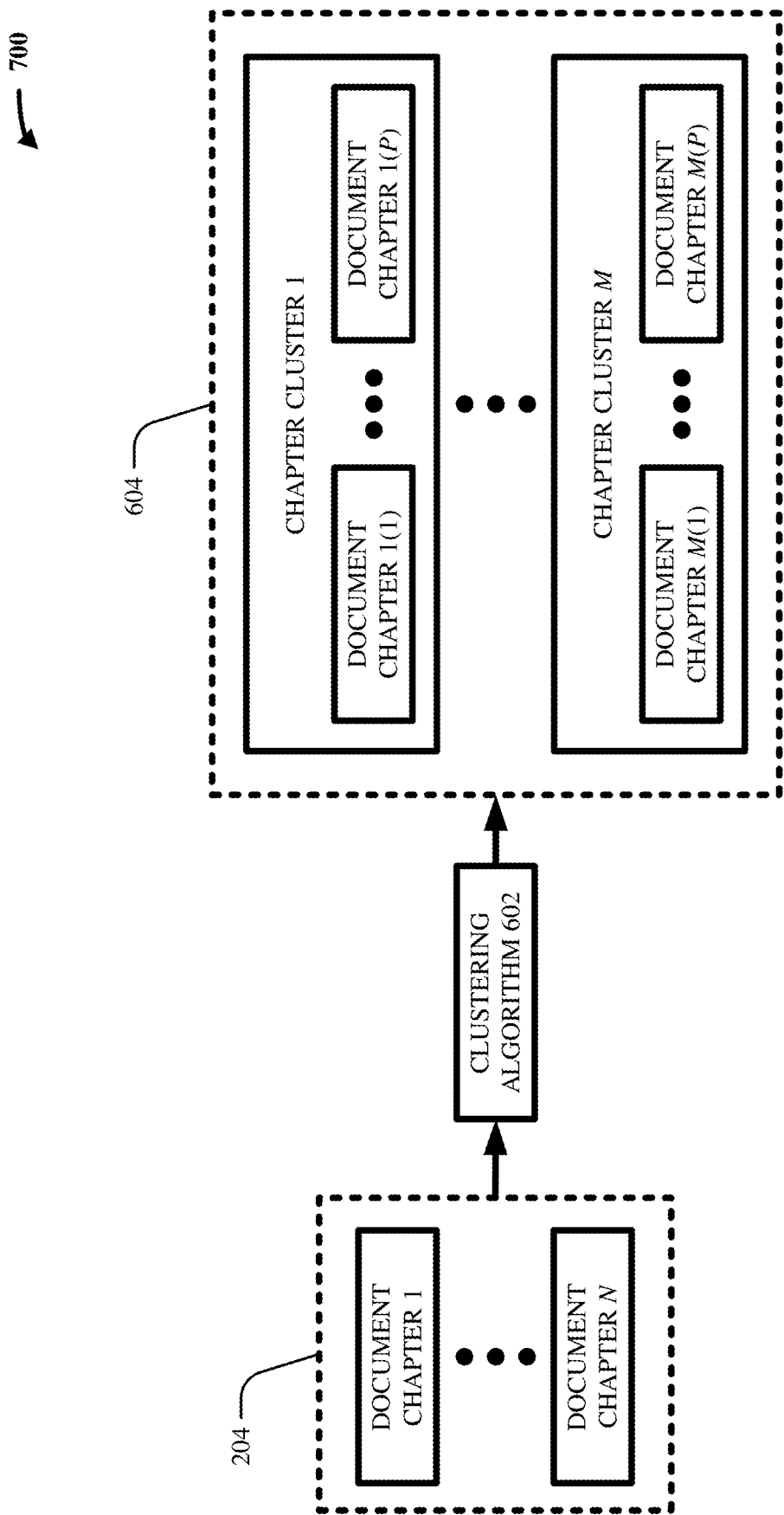
FIG. 7 illustrates a non-limiting, example block diagram showing how a clustering algorithm can group a set of document chapters into a set of chapter clusters in accordance with one or more embodiments described herein.

FIG. 7 illustrates a non-limiting, example block diagram 700 showing how the clustering algorithm 602 can group the set of document chapters 204 into the set of chapter clusters 604 in accordance with one or more embodiments described herein.

As explained above, the set of document chapters 204 can include n document chapters. In various cases, as shown, the set of chapter clusters 604 can include m chapter clusters, for any suitable positive integer m: a chapter cluster 1 to a chapter cluster m. In various instances, the chapter cluster 1 can include any suitable number of document chapters. For example, the chapter cluster 1 can include p document chapters, for any suitable positive integer p: a document chapter 1(1) to a document chapter 1(p). Likewise, the chapter cluster m can include any suitable number of document chapters. For example, the chapter cluster m can include p document chapters: a document chapter m(1) to a document chapter m(p). Although FIG. 7 illustrates the chapter cluster 1 and the chapter cluster m as having the same number of document chapters, this is a mere non-limiting example. Those having ordinary skill in the art will understand that different chapter clusters can include the same and/or different numbers of document chapters as each other.

In any case, the document component 112 can execute the clustering algorithm 602 on the set of document chapters 204, and such execution can result in the set of chapter clusters 604. In other words, the clustering algorithm 602 can group different ones of the set of document chapters 204 together according to similarity. That is, two document chapters that are considered as sufficiently similar to each other (e.g., having a similarity above any suitable threshold value) can be grouped into the same cluster, whereas two document chapters that are considered as insufficiently similar to each other (e.g., having a similarity below any suitable threshold value) can be grouped into different clusters. As those having ordinary skill in the art will appreciate, the similarity between any two document chapters can be mathematically defined in any suitable fashion. For example, similarity between two document chapters can be defined in terms of the Euclidean distance between the embedded representations of such two document chapters.

In various instances, the clustering algorithm 602 can be any suitable clustering technique as desired. For example, the clustering algorithm 602 can be a hierarchical clustering technique, such as single-linkage clustering. As another example, the clustering algorithm 602 can be a centroid-based clustering technique, such as k-means clustering or fuzzy c-means clustering. As yet another example, the clustering algorithm 602 can be a distribution-based clustering technique, such as Gaussian mixture modeling. As still another example, the clustering algorithm 602 can be a density-based clustering technique, such as DBSCAN. In any case, the clustering algorithm 602 can be any suitable mathematical technique for separating the set of document chapters 204 into any suitable number of different clusters of document chapters.

Figure 8:
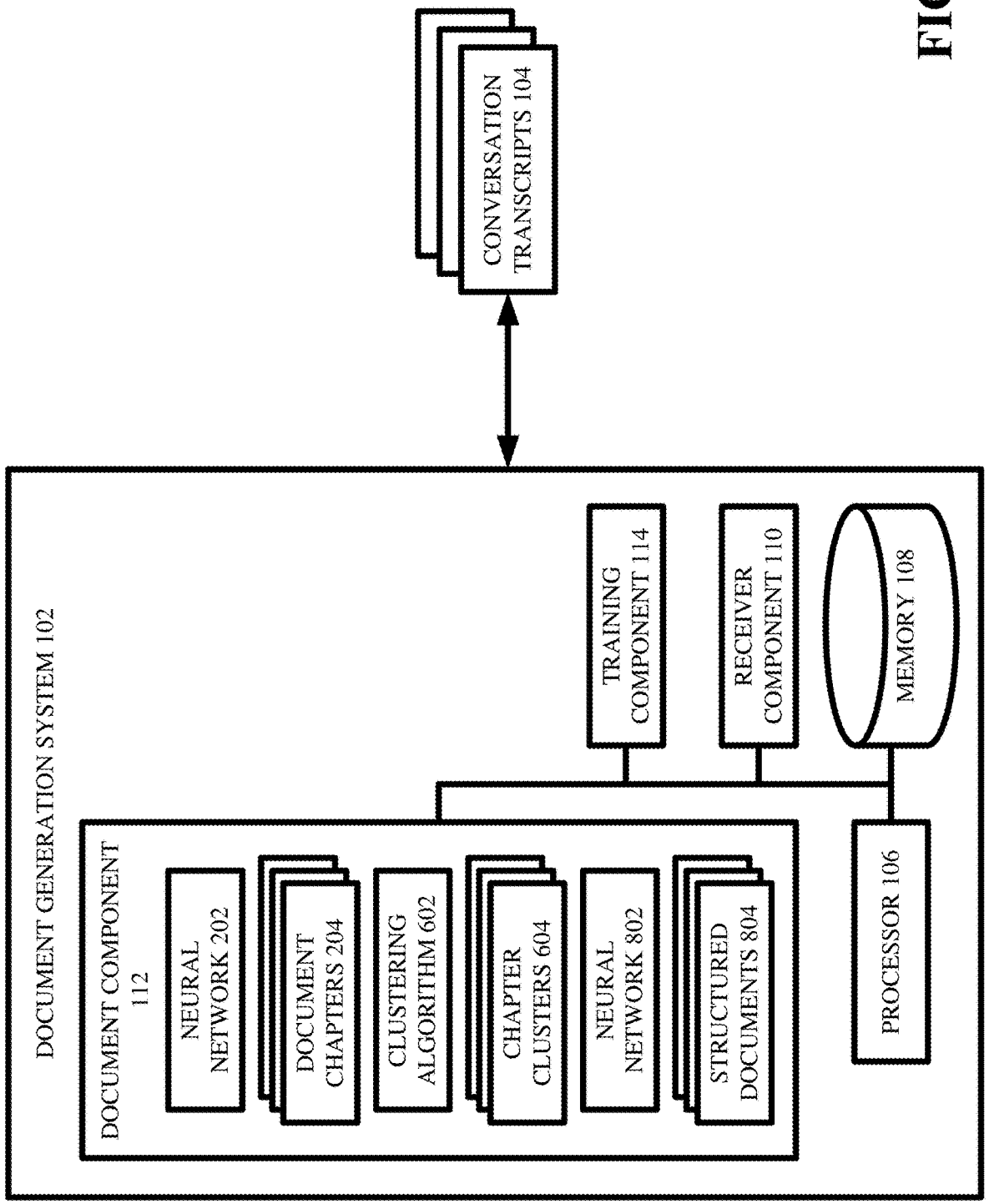
FIG. 8 illustrates a block diagram of an example, non-limiting system including a chapter-aggregation neural network that facilitates deep learning document generation from conversation transcripts in accordance with one or more embodiments described herein.

FIG. 8 illustrates a block diagram of an example, non-limiting system 800 including a chapter-aggregation neural network that can facilitate deep learning document generation from conversation transcripts in accordance with one or more embodiments described herein. As shown, the system 800 can, in some cases, comprise the same components as the system 600, and can further comprise a neural network 802 and/or a set of structured documents 804.

In various embodiments, the document component 112 can electronically store, electronically maintain, electronically control, and/or otherwise electronically access the neural network 802. In various aspects, the neural network 802 can exhibit any suitable deep learning architecture. For instance, the neural network 802 can comprise any suitable number of layers, such as an input layer, one or more hidden layers, and/or an output layer. Moreover, the neural network 802 can comprise any suitable numbers of neurons in various layers, such that different layers can have the same and/or different numbers of neurons as each other. Furthermore, the neural network 202 can comprise any suitable activation functions in various neurons, such as softmax, sigmoid, hyperbolic tangent, and/or rectified linear unit. Further still, the neural network 202 can comprise any suitable interneuron connections, such as forward connections, recurrent connections, and/or skip connections. As a non-limiting example, the neural network 802 can be a seq2seq network that comprises any suitable embedding layers and/or any suitable recurrent layers (e.g., such as LSTM layers and/or GRU layers). In any case, the neural network 802 can be configured to receive as input a given sequence of text tokens (e.g., a given sequence of words) and to produce as output a different and/or transformed sequence of text tokens (e.g., a different and/or transformed sequence of words).

Figure 19:
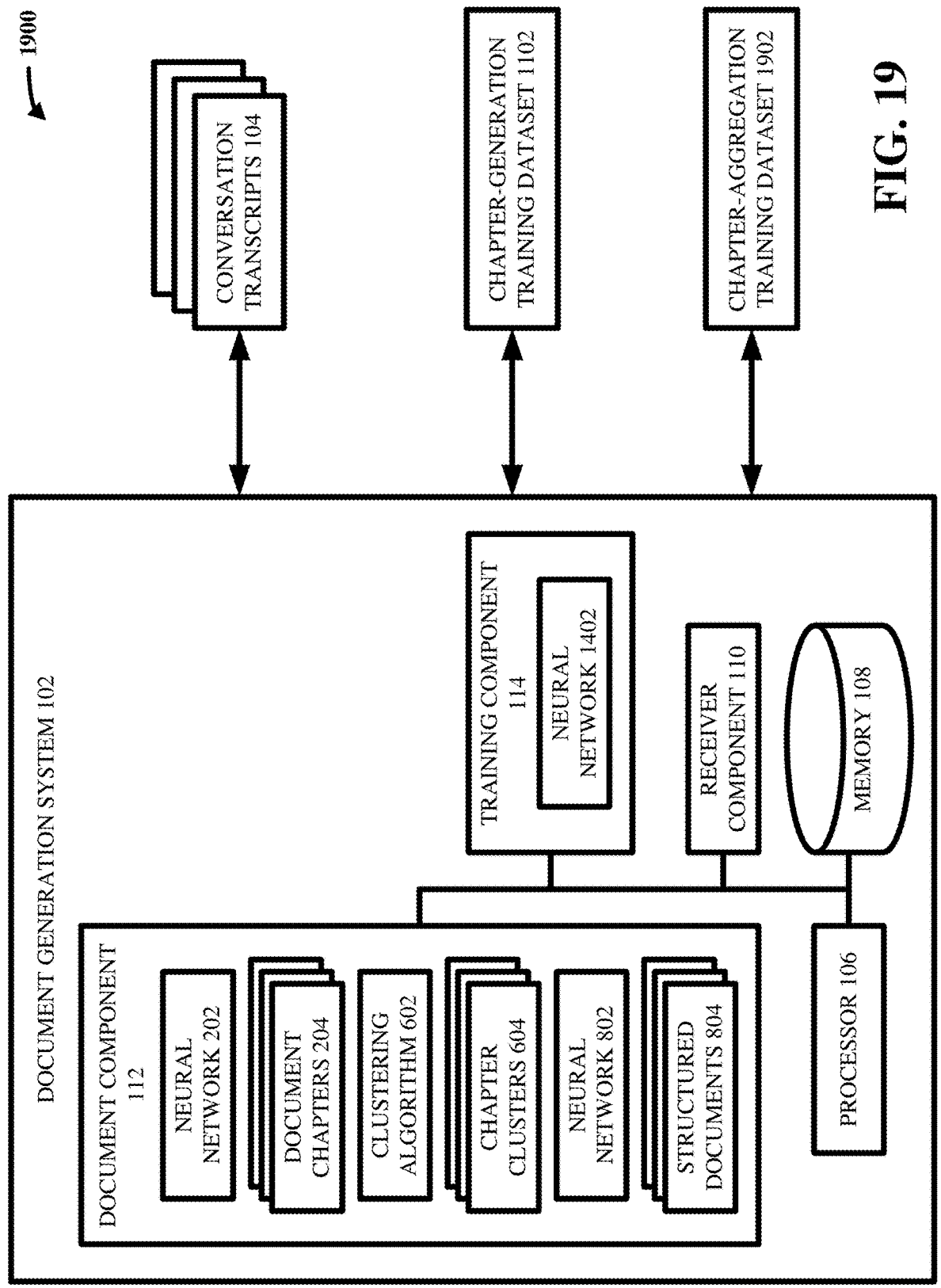
FIGS. 19-21 illustrate non-limiting, example block diagrams showing how a chapter-aggregation neural network can be trained in supervised fashion to output structured documents based on inputted clusters of document chapters in accordance with one or more embodiments described herein.
Figure 20:
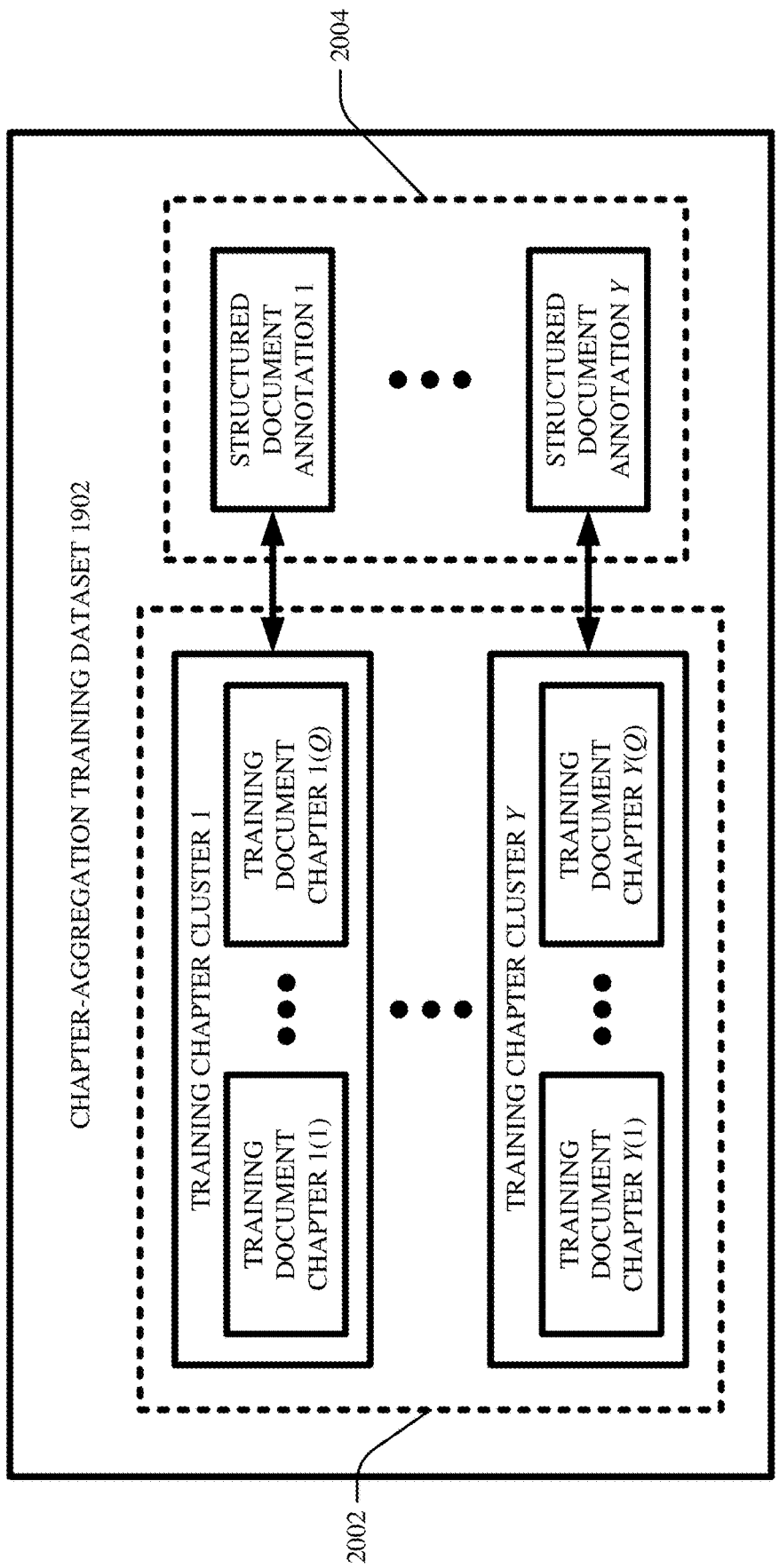
Figure 21:
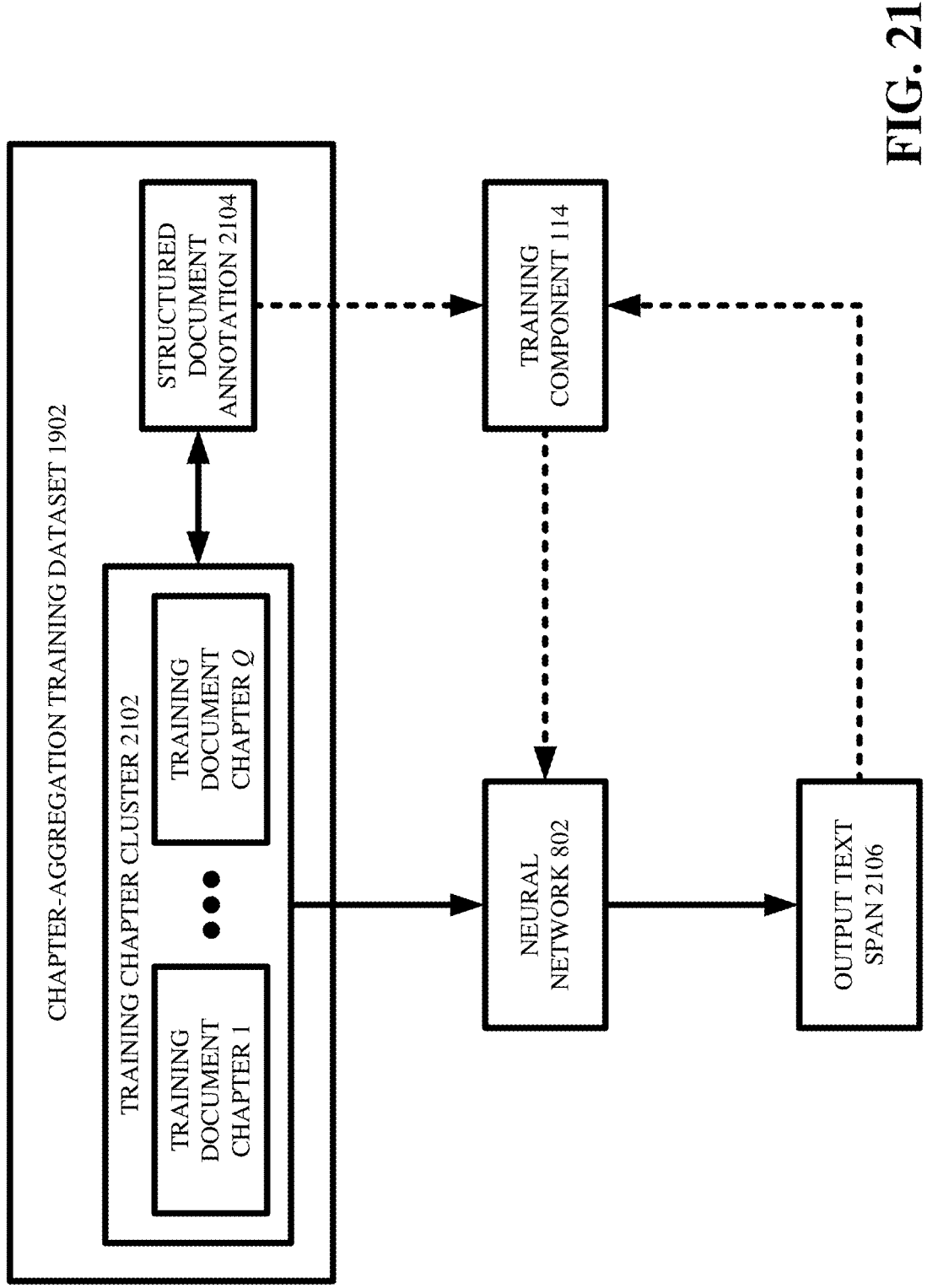

In various aspects, the neural network 802 can be trained (e.g., by the training component 114, as described in detail with respect to FIGS. 19-21) to receive as input a cluster of document chapters and to produce as output a structured document based on the inputted cluster of document chapters. Accordingly, in various instances, the document component 112 can electronically execute the neural network 802 on each of the set of chapter clusters 604, thereby resulting in the set of structured documents 804. This is further explained with respect to FIG. 9.

Figure 9:
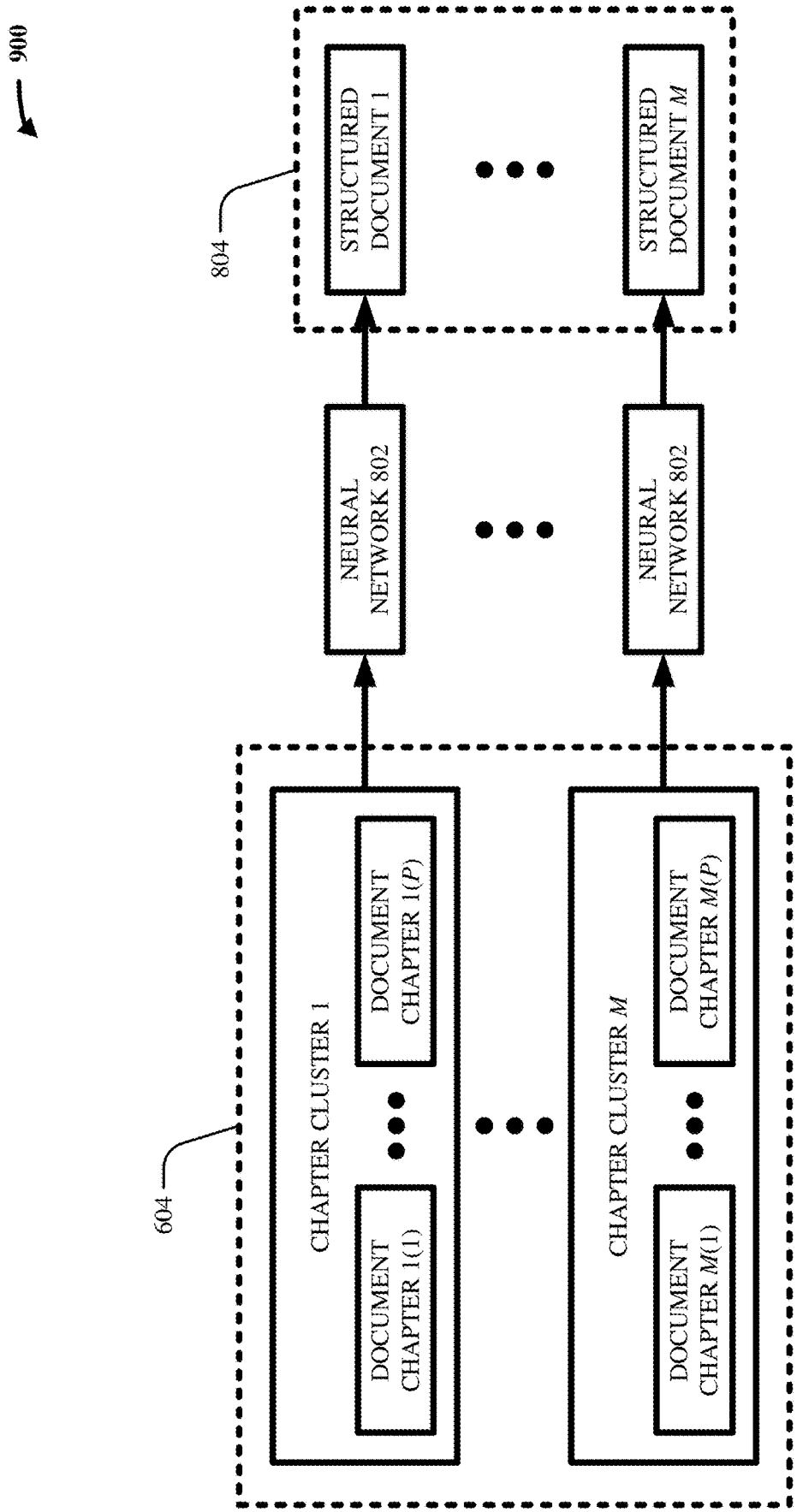
FIG. 9 illustrates a non-limiting, example block diagram showing how a chapter-aggregation neural network can generate structured documents from chapter clusters in accordance with one or more embodiments described herein.

FIG. 9 illustrates a non-limiting, example block diagram 900 showing how the neural network 802 can generate the set of structured documents 804 from the set of chapter clusters 604 in accordance with one or more embodiments described herein.

As mentioned above, the set of chapter clusters 604 can include m clusters. As also shown, the set of structured documents 804 can comprise m structured documents: a structured document 1 to a structured document m. Thus, the set of structured documents 804 can be considered as respectively corresponding to the set of chapter clusters 604.

In various aspects, the document component 112 can generate the set of structured documents 804 by executing the neural network 802 on each of the set of chapter clusters 604. For example, as shown, the document component 112 can feed the chapter cluster 1 as input to the neural network 802, and the neural network 802 can generate as output the structured document 1 based on the chapter cluster 1. More specifically, the chapter cluster 1 can be a sequence of text tokens, and the document component 112 can feed such sequence of text tokens to an input embedding layer of the neural network 802. As those having ordinary skill in the art will appreciate, the input embedding layer can convert, via any suitable word embedding technique and/or word embedding paradigm, the chapter cluster 1 into one or more scalars, vectors, matrices, and/or tensors. In various cases, such one or more scalars, vectors, matrices, and/or tensors can complete a forward pass through the internal layers (e.g., LSTM layers, GRU layers, RNN layers, other embedding layers) of the neural network 802, according to the interneuron connections (e.g., forward connections, recurrent connections, skip connections) that are implemented in the neural network 802. That is, activation of the internal layers can transform the one or more scalars, vectors, matrices, and/or tensors into one or more transformed scalars, vectors, matrices, and/or tensors. Finally, in various aspects, an output embedding layer of the neural network 802 can convert, via any suitable word embedding technique and/or word embedding paradigm, the one or more transformed scalars, vectors, matrices, and/or tensors into a resultant sequence of text tokens. In various cases, the resultant sequence of text tokens can be considered as the structured document 1. In various aspects, the structured document 1 can be a span of text that contains and/or conveys the same substantive information as the chapter cluster 1 but that is formatted/structured as a finalized instruction manual. For example, the structured document 1 can include all of the document chapters in the chapter cluster 1, can include a title page, can include a table of contents, can include page numbers, and/or can include an index.

As another example, as shown, the document component 112 can feed the chapter cluster m as input to the neural network 802, and the neural network 802 can generate as output the structured document m based on the chapter cluster m. More specifically, the chapter cluster m can be a sequence of text tokens, and the document component 112 can feed such sequence of text tokens to the input embedding layer of the neural network 802. As above, the input embedding layer can convert the chapter cluster m into one or more scalars, vectors, matrices, and/or tensors, and such one or more scalars, vectors, matrices, and/or tensors can complete a forward pass through the internal layers of the neural network 802. In other words, activation of the internal layers can transform the one or more scalars, vectors, matrices, and/or tensors into one or more transformed scalars, vectors, matrices, and/or tensors. Finally, in various aspects, the output embedding layer of the neural network 802 can convert, via any suitable word embedding technique and/or word embedding paradigm, the one or more transformed scalars, vectors, matrices, and/or tensors into a resultant sequence of text tokens. In various cases, the resultant sequence of text tokens can be considered as the structured document m. In various aspects, the structured document m can be a span of text that contains and/or conveys the same substantive information as the chapter cluster m but that is formatted/structured as a finalized instruction manual (e.g., can include all of the document chapters in the chapter cluster m, can include a title page, can include a table of contents, can include page numbers, and/or can include an index).

Figure 10:
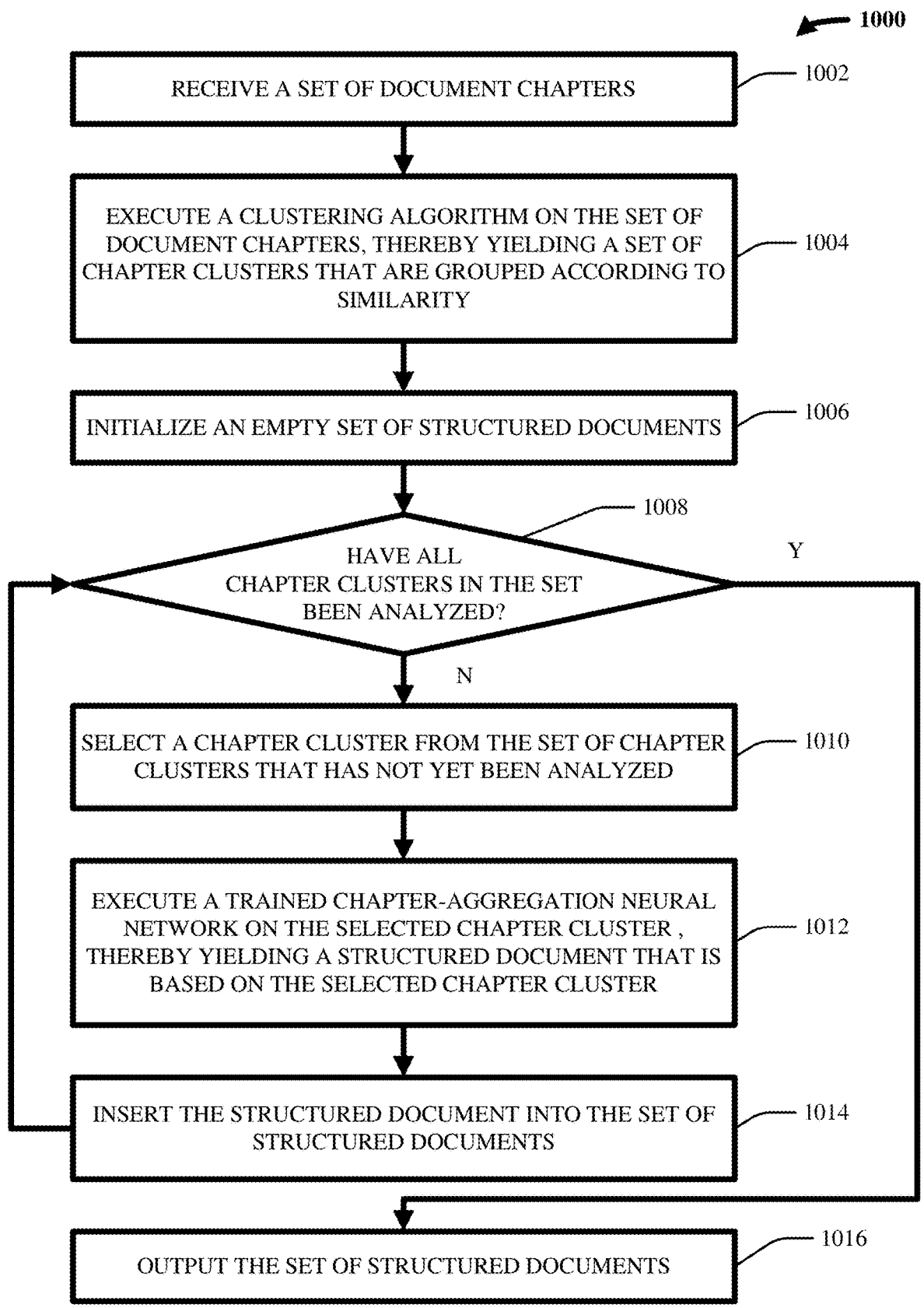
FIG. 10 illustrates a flow diagram of an example, non-limiting computer-implemented method that facilitates deep learning document generation from conversation transcripts in accordance with one or more embodiments described herein.

FIG. 10 illustrates a flow diagram of an example, non-limiting computer-implemented method 1000 that can facilitate deep learning document generation from conversation transcripts in accordance with one or more embodiments described herein. In various cases, the document generation system 102 can facilitate the computer-implemented method 1000.

In various embodiments, act 1002 can include receiving, by a device (e.g., 110) operatively coupled to a processor, a set of document chapters (e.g., 204).

In various aspects, act 1004 can include executing, by the device (e.g., 112), a clustering algorithm (e.g., 602) on the set of document chapters, thereby yielding a set of chapter clusters (e.g., 604) that are grouped according to similarity.

In various instances, act 1006 can include initializing, by the device (e.g., 112), an empty set of structured documents.

In various instances, act 1008 can include determining, by the device (e.g., 112), whether all chapter clusters in the set of chapter clusters have been analyzed by the device. If not, the computer-implemented method 1000 can proceed to act 1010. If so, the computer-implemented method 1000 can proceed to act 1016.

In various cases, act 1010 can include selecting, by the device (e.g., 112), a chapter cluster (e.g., one of 604) from the set of chapter clusters that has not yet been analyzed by the device.

In various aspects, act 1012 can include executing, by the device (e.g., 112), a trained chapter-aggregation neural network (e.g., 802) on the selected chapter cluster, thereby yielding a structured document (e.g., one of 804) that is based on the selected chapter cluster.

In various instances, act 1014 can include inserting, by the device (e.g., 112), the structured document into the set of structured documents. In various cases, the computer-implemented method 1000 can proceed back to act 1008.

In various aspects, act 1016 can include outputting, by the device (e.g., 112), the set of structured documents (e.g., 804).

In order for the neural network 202 to facilitate the above-described functionality, it must first be trained. In various cases, the training component 114 can facilitate such training, as described with respect to FIGS. 11-18. Similarly, in order for the neural network 802 to facilitate the above-described functionality, it must be trained, as well. In various cases, the training component 114 can facilitate such training, as described with respect to FIGS. 19-21.

Figure 11:
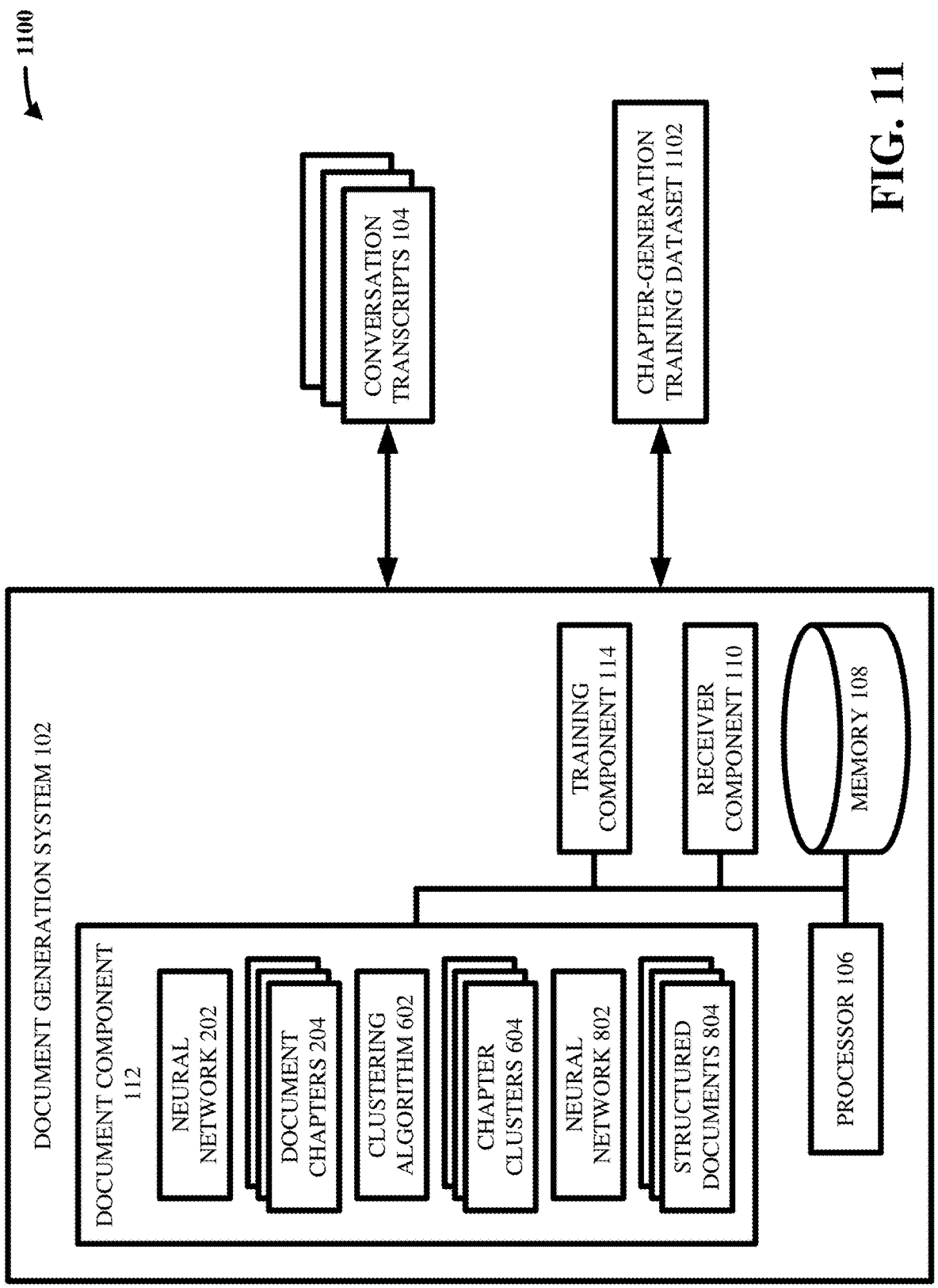
FIGS. 11-13 illustrate non-limiting, example block diagrams showing how a chapter-generation neural network can be trained in supervised fashion to output document chapters based on inputted conversation transcripts in accordance with one or more embodiments described herein.
Figure 12:
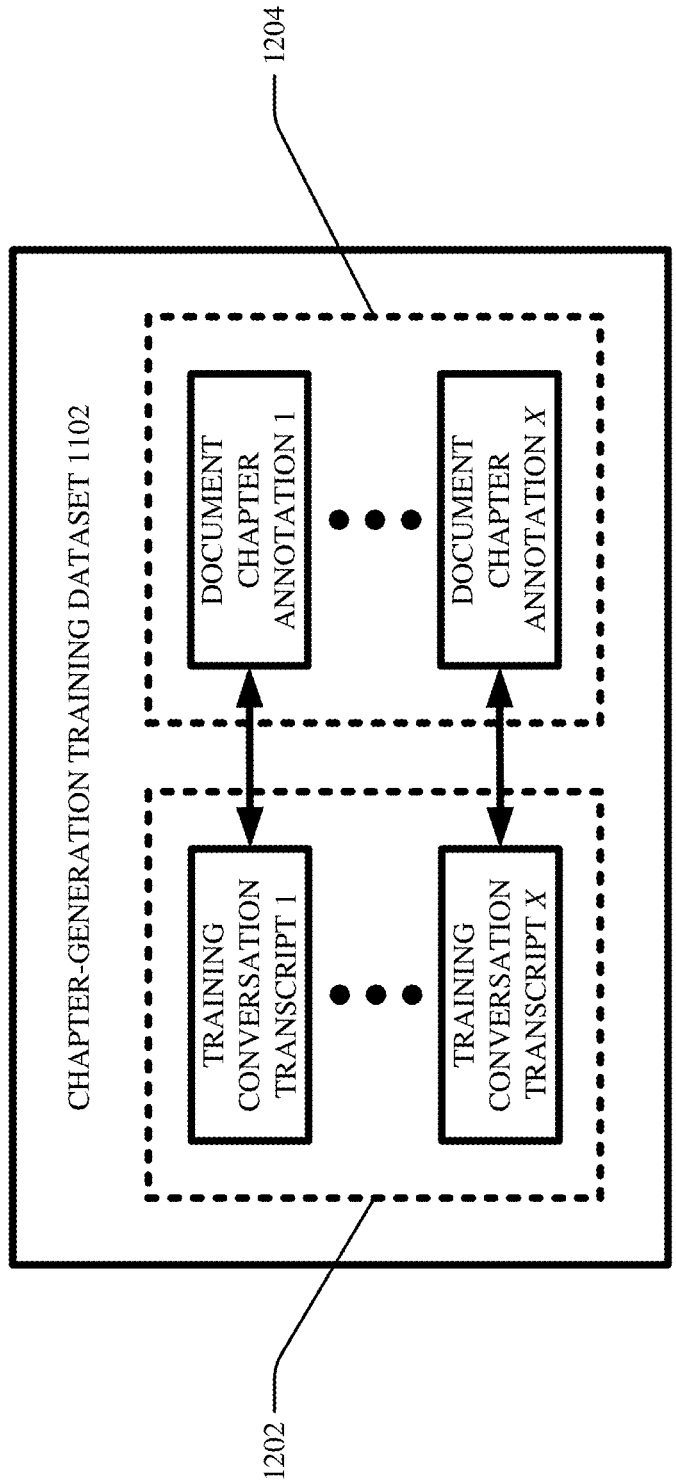
Figure 13:
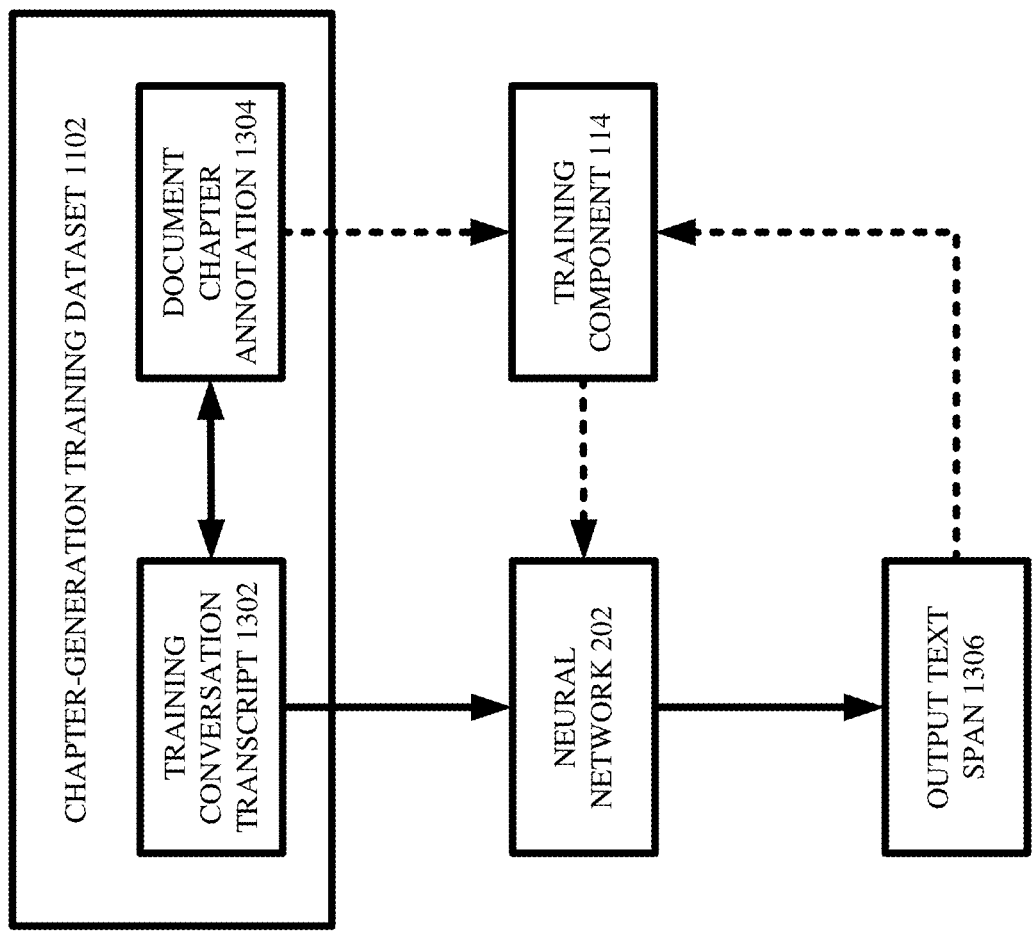

FIGS. 11-13 illustrate non-limiting, example block diagrams 1100-1300 showing how the neural network 202 can be trained in supervised fashion to output document chapters based on inputted conversation transcripts in accordance with one or more embodiments described herein.

As shown in FIG. 11, the receiver component 110 can, in various embodiments, electronically receive, retrieve, and/ or otherwise access, from any suitable centralized and/or decentralized data structure (not shown), a chapter-generation training dataset 1102. In various instances, the training component 114 can electronically train the neural network 202 on the chapter-generation training dataset 1102, as explained below.

FIG. 12 illustrates an example, non-limiting embodiment of the chapter-generation training dataset 1102. As shown, the chapter-generation training dataset 1102 can comprise a set of training conversation transcripts 1202 and a set of document chapter annotations 1204. In various cases, the set of training conversation transcripts 1202 can include x transcripts, for any suitable positive integer x: a training conversation transcript 1 to a training conversation transcript x. Likewise, the set of document chapter annotations 1204 can include x document chapters: a document chapter annotation 1 to a document chapter annotation x. As shown, the set of document chapter annotations 1204 can respectively correspond to the set of training conversation transcripts 1202. For example, the training conversation transcript 1 can correspond to the document chapter annotation 1. In other words, the document chapter annotation 1 can be considered as a known and/or ground-truth document chapter that would be obtained if chapter-generation were accurately and/or successfully applied to the training conversation transcript 1. Similarly, the training conversation transcript x can correspond to the document chapter annotation x. That is, the document chapter annotation x can be considered as a known and/or ground-truth document chapter that would be obtained if chapter-generation were accurately and/or successfully applied to the training conversation transcript x.

FIG. 13 illustrates a non-limiting example showing how the training component 114 can electronically train, in supervised fashion, the neural network 202 on the chapter-generation training dataset 1102. In various cases, the internal parameters (e.g., weight matrices, bias values) of the neural network 202 can be initialized in any suitable fashion (e.g., random initialization). As shown, the training component 114 can select from the chapter-generation training dataset 1102 a training conversation transcript 1302 and a document chapter annotation 1304 that corresponds to the training conversation transcript 1302. In various aspects, the training component 114 can feed the training conversation transcript 1302 to the neural network 202. In various cases, the training conversation transcript 1302 can complete a forward pass through the internal parameters of the neural network 202, which can cause the neural network 202 to produce an output text span 1306. In various aspects, the output text span 1306 can be considered as representing the document chapter that the neural network 202 believes should correspond to the training conversation transcript 1302. In contrast, the document chapter annotation 1304 can be considered as representing the actual and/or ground-truth document chapter that is known to correspond to the training conversation transcript 1302. Those having ordinary skill in the art will appreciate that, if the neural network 202 has so far undergone no and/or little training, the output text span 1306 can be very inaccurate (e.g., the output text span 1306 can appear to be gibberish). In any case, the training component 114 can compute an error/loss between the output text span 1306 and the document chapter annotation 1304 (e.g., cross-entropy error between the embedded vector representing the output text span 1306 and the embedded vector representing the document chapter annotation 1304). In various instances, the training component 114 can then use the computed error/loss to perform backpropagation on the neural network 202, thereby updating the internal parameters of the neural network 202. In various cases, the training component 114 can repeat this training procedure for any and/or all of the training conversation transcripts in the chapter-generation training dataset 1102, with the result being that the internal parameters of the neural network 202 become iteratively optimized for accurately inferring document chapters from inputted conversation transcripts.

Those having ordinary skill in the art will appreciate that any suitable training batch sizes, any suitable number of training epochs, any suitable error/loss function, and/or any suitable training termination criteria can be implemented by the training component 114.

In various cases, the neural network 202 can exhibit satisfactory performance when trained by the training component 114 as described with respect to FIG. 13. However, in some cases, the performance of the neural network 202 can be improved even further via reinforcement learning techniques, as described with respect to FIGS. 14-18.

Figure 14:
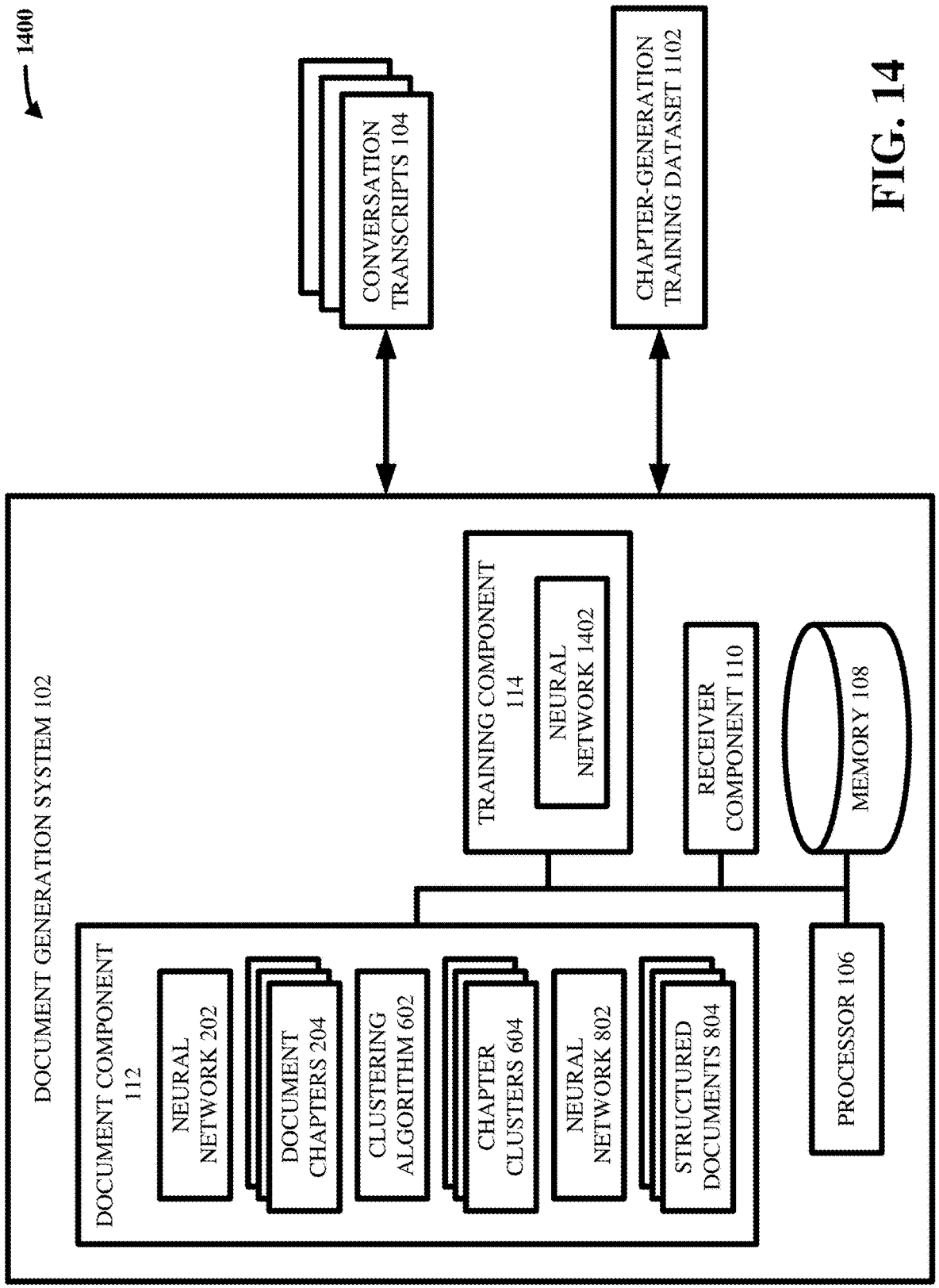
FIGS. 14-16 illustrate non-limiting, example block diagrams showing how a trained chapter-generation neural network can be improved in reinforcement learning fashion in accordance with one or more embodiments described herein.
Figure 15:
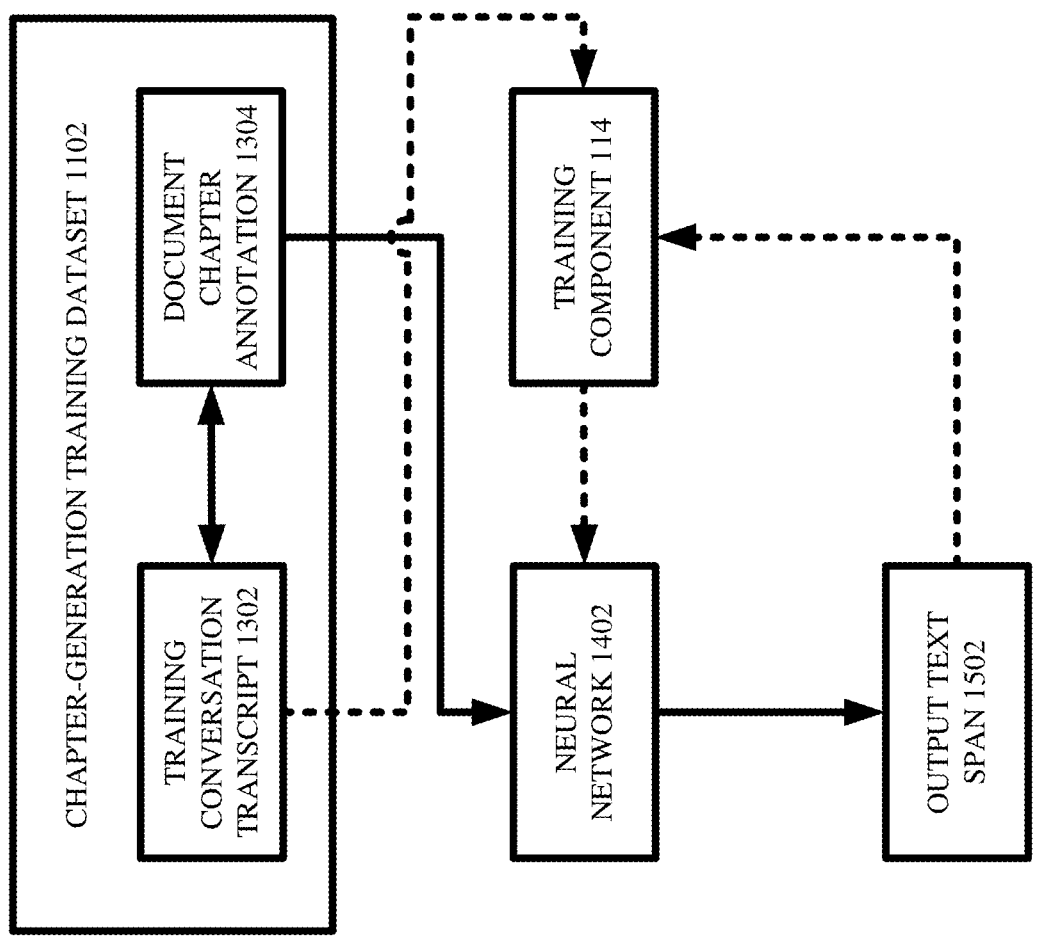
Figure 16:
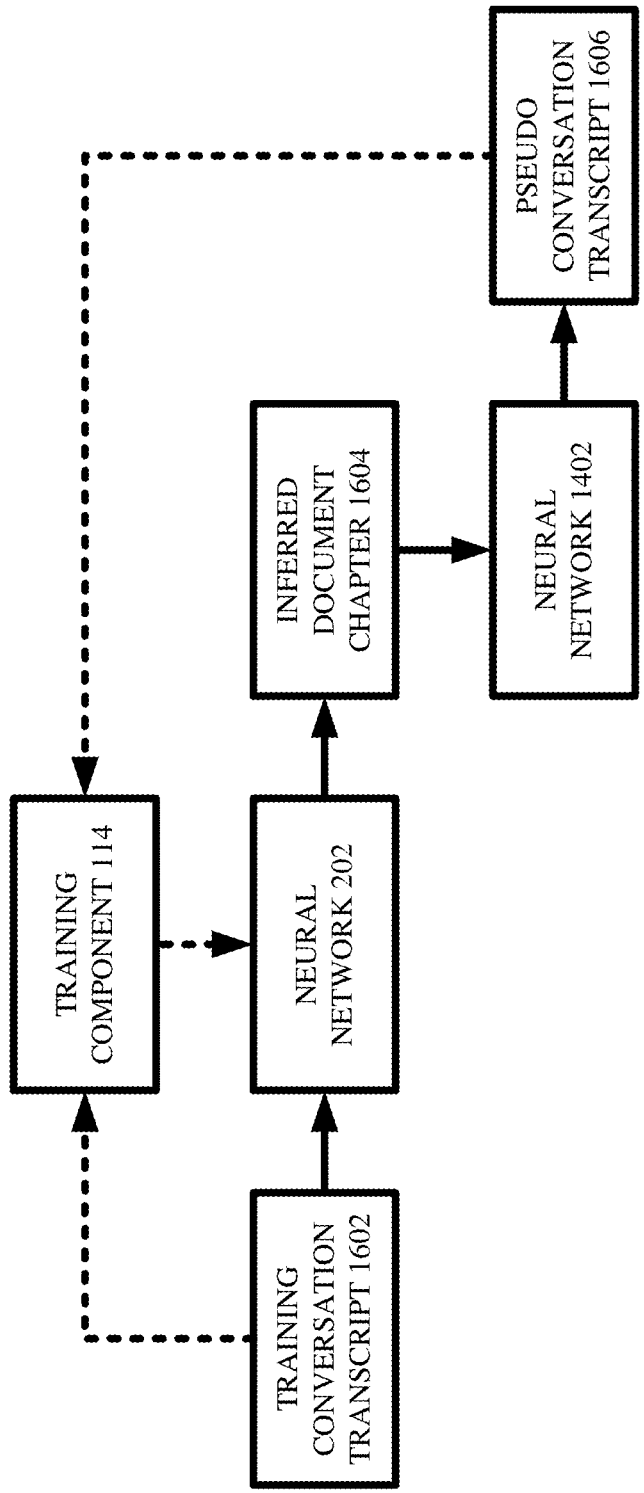

FIGS. 14-16 illustrate non-limiting, example block diagrams 1400-1600 showing how the neural network 202 can be improved in reinforcement learning fashion in accordance with one or more embodiments described herein.

As shown in FIG. 14, the training component 114 can, in various embodiments, electronically store, electronically maintain, electronically control, and/or otherwise electronically access a neural network 1402. In various aspects, the neural network 1402 can exhibit any suitable deep learning architecture. For instance, the neural network 1402 can comprise any suitable number of layers, such as an input layer, one or more hidden layers, and/or an output layer. Moreover, the neural network 1402 can comprise any suitable numbers of neurons in various layers, such that different layers can have the same and/or different numbers of neurons as each other. Furthermore, the neural network 1402 can comprise any suitable activation functions in various neurons, such as softmax, sigmoid, hyperbolic tangent, and/or rectified linear unit. Further still, the neural network 1402 can comprise any suitable interneuron connections, such as forward connections, recurrent connections, and/or skip connections. As a non-limiting example, the neural network 1402 can be a seq2seq network that comprises any suitable embedding layers and/or any suitable recurrent layers (e.g., such as LSTM layers and/or GRU layers). In any case, the neural network 1402 can be configured to receive as input a given sequence of text tokens (e.g., a given sequence of words) and to produce as output a different and/or transformed sequence of text tokens (e.g., a different and/or transformed sequence of words).

In various aspects, the neural network 1402 can be trained (e.g., by the training component 114, as described in detail with respect to FIG. 15) to receive as input a document chapter and to produce as output a conversation transcript based on the inputted document chapter. In other words, the neural network 1402 can be considered as performing the inverse operation of the neural network 202 (e.g., the neural network 202 can generate document chapters based on inputted conversation transcripts, whereas the neural network 1402 can generate conversation transcripts based on inputted document chapters).

FIG. 15 illustrates a non-limiting example showing how the training component 114 can electronically train, in supervised fashion, the neural network 1402 on the chapter-generation training dataset 1102. In various cases, the internal parameters (e.g., weight matrices, bias values) of the neural network 1402 can be initialized in any suitable fashion (e.g., random initialization). As shown, the training component 114 can select from the chapter-generation training dataset 1102 the training conversation transcript 1302 and the document chapter annotation 1304 that corresponds to the training conversation transcript 1302. In various aspects, the training component 114 can feed the document chapter annotation 1304 to the neural network 1402 (e.g., contrast this with FIG. 13, in which the training component 114 feeds the training conversation transcript 1302 to the neural network 202). In various cases, the document chapter annotation 1304 can complete a forward pass through the internal layers of the neural network 1402, which can cause the neural network 1402 to produce an output text span 1502. In various aspects, the output text span 1502 can be considered as representing the conversation transcript that the neural network 1402 believes should correspond to the document chapter annotation 1304. In contrast, the training conversation transcript 1302 can be considered as representing the actual and/or ground-truth conversation transcript that is known to correspond to the document chapter annotation 1304. Those having ordinary skill in the art will appreciate that, if the neural network 1402 has so far undergone no and/or little training, the output text span 1502 can be very inaccurate (e.g., the output text span 1502 can appear to be gibberish). In any case, the training component 114 can compute an error/loss between the output text span 1502 and the training conversation transcript 1302 (e.g., cross-entropy error between the embedded vector representing the output text span 1502 and the embedded vector representing the training conversation transcript 1302). In various instances, the training component 114 can then use the computed error/loss to perform backpropagation on the neural network 1402, thereby updating the internal parameters of the neural network 1402. In various cases, the training component 114 can repeat this training procedure for any and/or all of the document chapters in the chapter-generation training dataset 1102, with the result being that the internal parameters of the neural network 1402 become iteratively optimized for accurately inferring conversation transcripts from inputted document chapters.

Those having ordinary skill in the art will appreciate that any suitable training batch sizes, any suitable number of training epochs, any suitable error/loss function, and/or any suitable training termination criteria can be implemented by the training component 114.

After both the neural network 202 and the neural network 1402 have been trained as described with respect to FIGS. 13 and 15, the training component 114 can leverage the neural network 1402 in reinforcement learning fashion to further improve the performance of the neural network 202. This is shown in FIG. 16.

As shown in FIG. 16, in various embodiments, the training component 114 can select a training conversation transcript 1602 from the chapter-generation training dataset 1102. In various aspects, the training component 114 can feed the training conversation transcript 1602 as input to the neural network 202, which can cause the neural network 202 to produce as output an inferred document chapter 1604. In various cases, the inferred document chapter 1604 can be considered as the document chapter that the neural network 202 believes should correspond to the training conversation transcript 1602. In various instances, the training component 114 can feed the inferred document chapter 1604 to the neural network 1402, which can cause the neural network 1402 to produce as output a pseudo conversation transcript 1606. In various cases, the pseudo conversation transcript 1606 can be considered as the conversation transcript which the neural network 1402 believes should correspond to the inferred document 1604. In various aspects, it can be the case that the pseudo conversation transcript 1606 is more similar to and/or less different from the training conversation transcript 1602 when the inferred document chapter 1604 is accurate/correct. On the other hand, it can be the case that the pseudo conversation transcript 1606 is less similar to and/or more different from the training conversation transcript 1602 when the inferred document chapter 1604 is inaccurate/incorrect. Accordingly, the training component 114 can compute an error/loss between the pseudo conversation transcript 1606 and the training conversation transcript 1602 (e.g., cross-entropy error between the embedded vector representing the pseudo conversation transcript 1606 and the embedded vector representing the training conversation transcript 1602).

In various instances, the training component 114 can treat such error/loss as a reinforcement learning reward/punishment. More specifically, the training component 114 can electronically access a parameter-perturbation policy (not shown). In various instances, the parameter-perturbation policy can be any suitable mapping of parameter states (e.g., weight matrix values, bias values) of the neural network 202 to updates/changes to be made to the parameters of the neural network 202. In other words, the parameter-perturbation policy can specify how the internal parameters of the neural network 202 should be updated/changed, when given the current values of the internal parameters of the neural network 202. In various cases, the parameter-perturbation policy can be initialized in any suitable fashion (e.g., random initialization), and the training component 114 can iteratively update, via any suitable reinforcement learning technique, the parameter-perturbation policy based on the computed error/loss. As those having ordinary skill in the art will appreciate, any suitable reinforcement learning technique can be implemented so as to minimize the computed error/loss. As some non-limiting examples, the reinforcement learning technique can be dynamic programming, Q-learning, deep Q-learning, and/or proximal policy optimization.

In any case, once the training component 114 computes the error/loss between the pseudo conversation transcript 1606 and the training conversation transcript 1602, the training component 114 can update the parameter-perturbation policy based on the error/loss, the training component 114 can identify in the updated parameter-perturbation policy which update/change should be made to the parameters of the neural network 202, and the training component 114 can perform such identified update/change on the parameters of the neural network 202.

In various aspects, the training component 114 can repeat this procedure for any and/or all of the training conversation transcripts in the chapter-generation training dataset 1102 (e.g., can select another training conversation transcript; can feed the another training conversation transcript to the neural network 202, thereby yielding another inferred document chapter; can feed the another inferred document chapter to the neural network 1402, thereby yielding another pseudo conversation transcript; can compute another error/loss between the another training conversation transcript and the another pseudo conversation transcript; can update the parameter-perturbation policy based on the another error/loss; can identify, within the updated parameter-perturbation policy, another update/change to be made to the parameters of the neural network 202; and/or can perform the another identified update/change on the parameters of the neural network 202). Such repetition can ultimately cause the parameter-perturbation policy to be become optimized, which can indirectly cause the internal parameters of the neural network 202 to become even more further improved. In various cases, the internal parameters of the neural network 1402 can be frozen and/or can otherwise remain unchanged during such repetition.

FIGS. 17-18 illustrate views 1700-1800 of non-limiting, example conversation transcripts and document chapters that show significant performance benefits of a chapter-generation neural network due to reinforcement learning improvement. More specifically, FIG. 17 shows a training conversation transcript 1702, and FIG. 18 shows an inferred document chapter 1802, an inferred document chapter 1804, and a ground-truth document chapter annotation 1806. In various cases, the inventors of various embodiments described herein reduced to practice an embodiment of the neural network 202. In various cases, the inventors trained the neural network 202 in supervised fashion as described with respect to FIGS. 11-13. Once the neural network 202 was trained in such supervised fashion, the inventors executed the neural network 202 on the training conversation transcript 1702, and the result of such execution was the inferred document chapter 1802. Afterward, the inventors further trained the neural network 202 in reinforcement learning fashion as described with respect to FIGS. 14-16. Once the neural network 202 was further trained in such reinforcement learning fashion, the inventors again executed the neural network 202 on the training conversation transcript 1702, and the result of such execution was the inferred document chapter 1804. In various cases, the ground-truth document chapter annotation 1806 is the correct document chapter that is known to correspond to the training conversation transcript 1702. As can be seen from FIG. 18, the inferred document chapter 1804 is very similar to the ground-truth document chapter annotation 1806. In contrast, the inferred document chapter 1802 is less similar to the ground-truth document chapter annotation 1806.

Accordingly, FIGS. 17-18 show that training the neural network 202 in reinforcement learning fashion by leveraging the neural network 1402 can cause the performance of the neural network 202 to be even further improved, as compared to supervised training of the neural network 202 alone. Indeed, the inventors of various embodiments described herein experimentally tested the performance of the neural network 202 after supervised training alone and after supervised training combined with reinforcement learning. For the former scenario, the neural network 202 exhibited bilingual evaluation understudy (BLEU) scores between 12.71 and 14.61. In contrast, for the latter scenario, the neural network 202 exhibited BLEU scores between 19.25 and 21.93. This further demonstrates that the performance of the neural network 202 can be significantly improved by applying reinforcement learning as described with respect to FIGS. 14-16.

FIGS. 19-21 illustrate non-limiting, example block diagrams 1900-2100 showing how the neural network 802 can be trained in supervised fashion to output structured documents based on inputted clusters of document chapters in accordance with one or more embodiments described herein.

As shown in FIG. 19, the receiver component 110 can, in various embodiments, electronically receive, retrieve, and/or otherwise access, from any suitable centralized and/or decentralized data structure (not shown), a chapter-aggregation training dataset 1902. In various instances, the training component 114 can electronically train the neural network 802 on the chapter-aggregation training dataset 1902, as explained below.

FIG. 20 illustrates an example, non-limiting embodiment of the chapter-aggregation training dataset 1902. As shown, the chapter-aggregation training dataset 1902 can comprise a set of training chapter clusters 2002 and a set of structured document annotations 2004. In various cases, the set of training chapter clusters 2002 can include y clusters, for any suitable positive integer y: a training chapter cluster 1 containing q training document chapters for any suitable positive integer q, to a training chapter cluster y containing q training document chapters. As those having ordinary skill in the art will appreciate, different clusters in the set of training chapter clusters 2002 can include the same and/or different numbers of document chapters as each other. In various instances, the set of structured document annotations 2004 can include y structured documents: a structured document annotation 1 to a structured document annotation y. As shown, the set of training chapter clusters 2002 can respectively correspond to the set of structured document annotations 2004. For example, the training chapter cluster 1 can correspond to the structured document annotation 1. In other words, the structured document annotation 1 can be considered as a known and/or ground-truth finalized document (e.g., finalized instruction manual) that would be obtained if chapter-aggregation were accurately and/or successfully applied to the training chapter cluster 1. Similarly, the training chapter cluster y can correspond to the structured document annotation y. That is, the structured document annotation y can be considered as a known and/or ground-truth finalized document (e.g., finalized instruction manual) that would be obtained if chapter-aggregation were accurately and/or successfully applied to the training chapter cluster y.

FIG. 21 illustrates a non-limiting example showing how the training component 114 can electronically train, in supervised fashion, the neural network 802 on the chapter-aggregation training dataset 1902. In various cases, the internal parameters (e.g., weight matrices, bias values) of the neural network 802 can be initialized in any suitable fashion (e.g., random initialization). As shown, the training component 114 can select from the chapter-aggregation training dataset 1902 a training chapter cluster 2102 and a structured document annotation 2104 that corresponds to the training chapter cluster 2102. In various aspects, the training component 114 can feed the training chapter cluster 2102 to the neural network 802. In various cases, the training chapter cluster 2102 can complete a forward pass through the internal layers of the neural network 802, which can cause the neural network 802 to produce an output text span 2106. In various aspects, the output text span 2106 can be considered as representing the structured document (e.g., instruction manual) that the neural network 802 believes should correspond to the training chapter cluster 2102. In contrast, the structured document annotation 2104 can be considered as representing the actual and/or ground-truth structured document that is known to correspond to the training chapter cluster 2102. Those having ordinary skill in the art will appreciate that, if the neural network 802 has so far undergone no and/or little training, the output text span 2106 can be very inaccurate (e.g., the output text span 2106 can look like gibberish). In any case, the training component 114 can compute an error/loss between the output text span 2106 and the structured document annotation 2104 (e.g., cross-entropy error between the embedded vector representing the output text span 2106 and the embedded vector representing the structured document annotation 2104). In various instances, the training component 114 can then use the computed error/loss to perform backpropagation on the neural network 802, thereby updating the internal parameters of the neural network 802. In various cases, the training component 114 can repeat this training procedure for any and/or all of the training chapter clusters in the chapter-aggregation training dataset 1902, with the result being that the internal parameters of the neural network 802 become iteratively optimized for accurately inferring structured documents from inputted chapter clusters.

Those having ordinary skill in the art will appreciate that any suitable training batch sizes, any suitable number of training epochs, any suitable error/loss function, and/or any suitable training termination criteria can be implemented by the training component 114.

Figure 22:
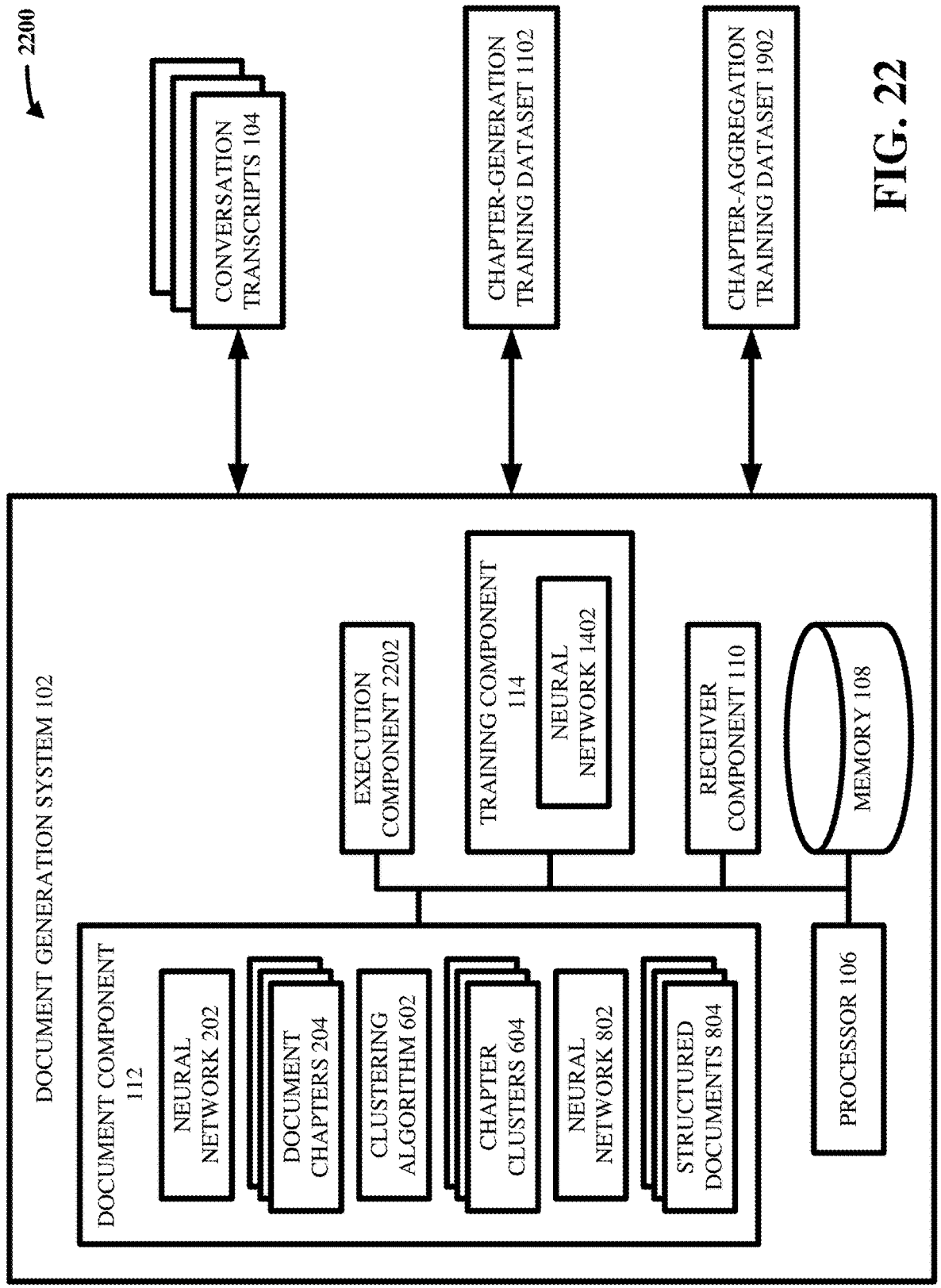
FIG. 22 illustrates a block diagram of an example, non-limiting system including an execution component that facilitates deep learning document generation from conversation transcripts in accordance with one or more embodiments described herein.

FIG. 22 illustrates a block diagram of an example, non-limiting system 2200 including an execution component that can facilitate deep learning document generation from conversation transcripts in accordance with one or more embodiments described herein. As shown, the system 2200 can, in some cases comprise the same components as the system 1400, and can further include an execution component 2202. In various embodiments, the execution component 2202 can perform any suitable computerized actions based on the set of structured documents 804. For example, the execution component 2202 can electronically transmit the set of structured documents 804 to any suitable computing devices (not shown). As another example, the execution component 2202 can electronically instruct a printer (e.g., an inkjet printer) to print out the set of structured documents 804.

Figure 23:
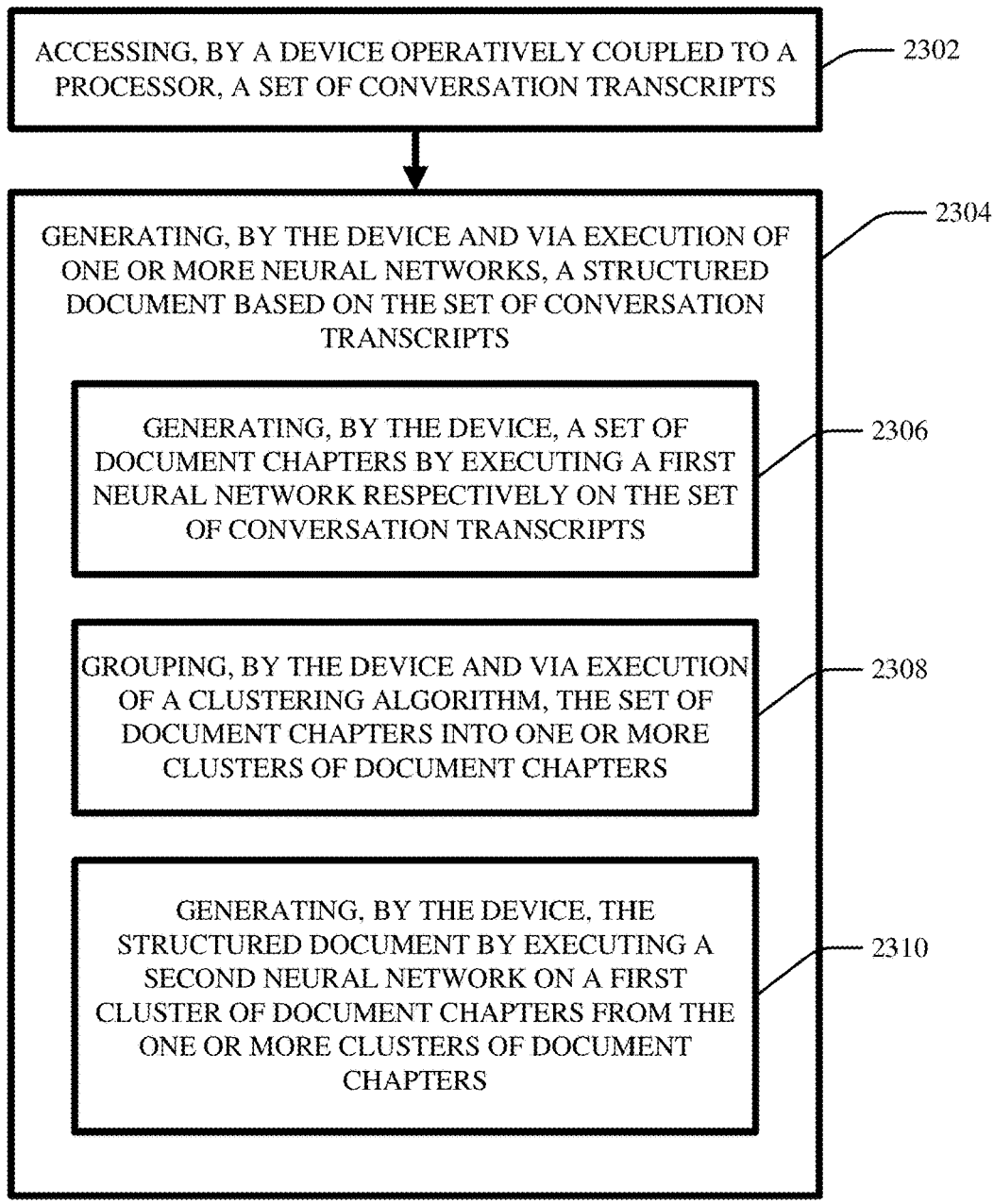
FIG. 23 illustrates a flow diagram of an example, non-limiting computer-implemented method that facilitates deep learning document generation from conversation transcripts in accordance with one or more embodiments described herein.

FIG. 23 illustrates a flow diagram of an example, non-limiting computer-implemented method 2300 that can facilitate deep learning document generation from conversation transcripts in accordance with one or more embodiments described herein. In various cases, the computer-implemented method 2300 can be facilitated by the document generation system 102.

In various embodiments, act 2302 can include accessing, by a device (e.g., 110) operatively coupled to a processor, a set of conversation transcripts (e.g., 104).

In various aspects, act 2304 can include generating, by the device (e.g., 112) and via execution of one or more neural networks (e.g., 202 and/or 802), a structured document (e.g., one of 804) based on the set of conversation transcripts.

In various instances, act 2304 can include a sub-act 2306. In various cases, the sub-act 2306 can include generating, by the device (e.g., 112), a set of document chapters (e.g., 204) by executing a first neural network (e.g., 202) on the set of conversation transcripts.

In various aspects, act 2304 can further include a sub-act 2308. In various cases, the sub-act 2308 can include grouping, by the device (e.g., 112) and via execution of a clustering algorithm (e.g., 602), the set of document chapters into one or more clusters of document chapters (e.g., 604).

In various instances, act 2304 can further include a sub-act 2310. In various cases, the sub-act 2310 can include generating, by the device (e.g., 112), the structured document by executing a second neural network (e.g., 802) on a first cluster (e.g., one of 604) from the one or more clusters of document chapters.

Although not explicitly shown in FIG. 23, the computer-implemented method 2300 can further include: accessing, by the device (e.g., 110), a training dataset (e.g., 1102), wherein the training dataset includes a set of training conversation transcripts (e.g., 1202) and a set of document chapter annotations (e.g., 1204) that respectively correspond to the set of training conversation transcripts; and training, by the device (e.g., 114), the first neural network, via backpropagation based on the training dataset, to output document chapters based on inputted conversation transcripts (e.g., as shown with respect to FIG. 13).

Although not explicitly shown in FIG. 23, the computer-implemented method 2300 can further include: training, by the device (e.g., 114) and via backpropagation based on the training dataset, another neural network (e.g., 1402) to output conversation transcripts based on inputted document chapters; and additionally training, by the device (e.g., 114), the first neural network in a reinforcement-learning fashion based on the another neural network (e.g., as shown with respect to FIG. 16).

Various embodiments described herein include a computerized tool that can automatically generate structured documents (e.g., formatted instruction manuals) by executing trained neural networks on transcripts of spoken/verbal conversations. Such a computerized tool certainly constitutes a useful and practical application of computers.

Although various embodiments described herein include a conversation transcript (e.g., one of 104) as being a record and/or log of a spoken/verbal conversation, this is a mere non-limiting example. Those having ordinary skill in the art will appreciate that a conversation transcript can, in various embodiments, be any suitable record and/or log of any suitable dialogue between two or more entities (e.g., human and/or otherwise). For example, in some cases, a conversation transcript can be a record/log of a text-based dialogue between two or more entities, a record/log of an electronic-chat-based dialogue between two or more entities, and/or a record/log of an instant-message-based dialogue between two or more entities.

Those having ordinary skill in the art will appreciate that the herein disclosure describes non-limiting examples of various embodiments of the invention. For ease of description and/or explanation, various portions of the herein disclosure utilize the term "each" when discussing various embodiments of the invention. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the invention, and it should be further understood that, in various other embodiments of the invention, it can be the case that such description applies to fewer than "each" of that particular computerized object.

Figure 24:
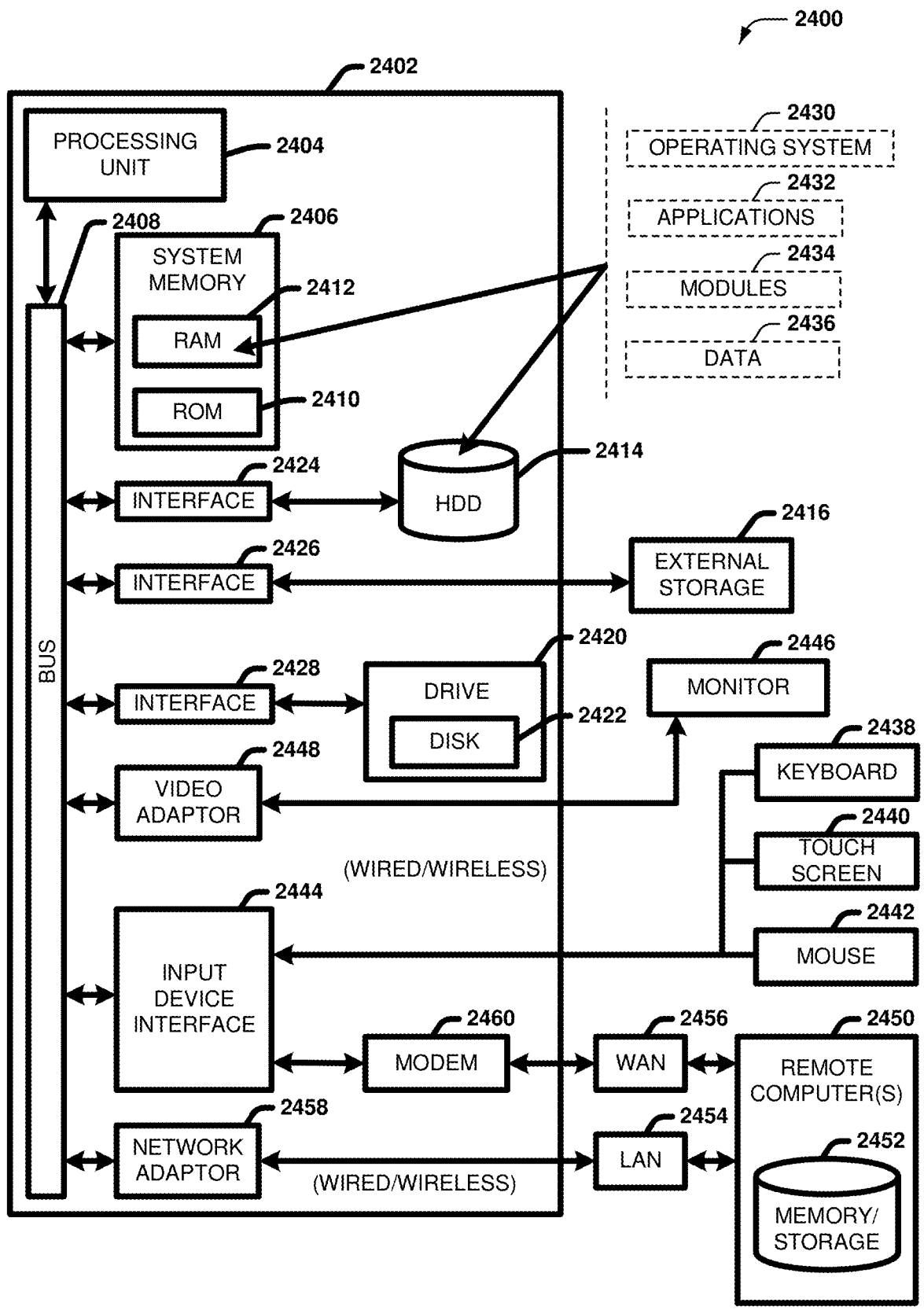
FIG. 24 illustrates a block diagram of an example, non-limiting operating environment in which one or more embodiments described herein can be facilitated.

In order to provide additional context for various embodiments described herein, FIG. 24 and the following discussion are intended to provide a brief, general description of a suitable computing environment 2400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the example environment 2400 for implementing various embodiments of the aspects described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi processor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes ROM 2410 and RAM 2412. A basic input/output system (BIOS) can be stored in a non-volatile memory such as ROM, erasable programmable read only memory (EPROM), EEPROM, which BIOS contains the basic routines that help to transfer information between elements within the computer 2402, such as during startup. The RAM 2412 can also include a high-speed RAM such as static RAM for caching data.

The computer 2402 further includes an internal hard disk drive (HDD) 2414 (e.g., EIDE, SATA), one or more external storage devices 2416 (e.g., a magnetic floppy disk drive (FDD) 2416, a memory stick or flash drive reader, a memory card reader, etc.) and a drive 2420, e.g., such as a solid state drive, an optical disk drive, which can read or write from a disk 2422, such as a CD-ROM disc, a DVD, a BD, etc. Alternatively, where a solid state drive is involved, disk 2422 would not be included, unless separate. While the internal HDD 2414 is illustrated as located within the computer 2402, the internal HDD 2414 can also be configured for external use in a suitable chassis (not shown). Additionally, while not shown in environment 2400, a solid state drive (SSD) could be used in addition to, or in place of, an HDD 2414. The HDD 2414, external storage device(s) 2416 and drive 2420 can be connected to the system bus 2408 by an HDD interface 2424, an external storage interface 2426 and a drive interface 2428, respectively. The interface 2424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. The systems and methods described herein can be implemented utilizing various commercially available operating systems or combinations of operating systems.

Computer 2402 can optionally comprise emulation technologies. For example, a hypervisor (not shown) or other intermediary can emulate a hardware environment for operating system 2430, and the emulated hardware can optionally be different from the hardware illustrated in FIG. 24. In such an embodiment, operating system 2430 can comprise one virtual machine (VM) of multiple VMs hosted at computer 2402. Furthermore, operating system 2430 can provide runtime environments, such as the Java runtime environment or the .NET framework, for applications 2432. Runtime environments are consistent execution environments that allow applications 2432 to run on any operating system that includes the runtime environment. Similarly, operating system 2430 can support containers, and applications 2432 can be in the form of containers, which are lightweight, standalone, executable packages of software that include, e.g., code, runtime, system tools, system libraries and settings for an application.

Further, computer 2402 can be enable with a security module, such as a trusted processing module (TPM). For instance with a TPM, boot components hash next in time boot components, and wait for a match of results to secured values, before loading a next boot component. This process can take place at any layer in the code execution stack of computer 2402, e.g., applied at the application execution level or at the operating system (OS) kernel level, thereby enabling security at any level of code execution.

A user can enter commands and information into the computer 2402 through one or more wired/wireless input devices, e.g., a keyboard 2438, a touch screen 2440, and a pointing device, such as a mouse 2442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2404 through an input device interface 2444 that can be coupled to the system bus 2408, but can be connected by other interfaces, such as a parallel port, an IEEE 1394 serial port, a game port, a USB port, an IR interface, a BLUETOOTH® interface, etc.

A monitor 2446 or other type of display device can be also connected to the system bus 2408 via an interface, such as a video adapter 2448. In addition to the monitor 2446, a computer typically includes other peripheral output devices (not shown), such as speakers, printers, etc.

The computer 2402 can operate in a networked environment using logical connections via wired and/or wireless communications to one or more remote computers, such as a remote computer(s) 2450. The remote computer(s) 2450 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2452 is illustrated. The logical connections depicted include wired/wireless connectivity to a local area network (LAN) 2454 and/or larger networks, e.g., a wide area network (WAN) 2456. Such LAN and WAN networking environments are commonplace in offices and companies, and facilitate enterprise-wide computer networks, such as intranets, all of which can connect to a global communications network, e.g., the Internet.

When used in a LAN networking environment, the computer 2402 can be connected to the local network 2454 through a wired and/or wireless communication network interface or adapter 2458. The adapter 2458 can facilitate wired or wireless communication to the LAN 2454, which can also include a wireless access point (AP) disposed thereon for communicating with the adapter 2458 in a wireless mode.

When used in a WAN networking environment, the computer 2402 can include a modem 2460 or can be connected to a communications server on the WAN 2456 via other means for establishing communications over the WAN 2456, such as by way of the Internet. The modem 2460, which can be internal or external and a wired or wireless device, can be connected to the system bus 2408 via the input device interface 2444. In a networked environment, program modules depicted relative to the computer 2402 or portions thereof, can be stored in the remote memory/storage device 2452. It will be appreciated that the network connections shown are example and other means of establishing a communications link between the computers can be used.

When used in either a LAN or WAN networking environment, the computer 2402 can access cloud storage systems or other network-based storage systems in addition to, or in place of, external storage devices 2416 as described above, such as but not limited to a network virtual machine providing one or more aspects of storage or processing of information. Generally, a connection between the computer 2402 and a cloud storage system can be established over a LAN 2454 or WAN 2456 e.g., by the adapter 2458 or modem 2460, respectively. Upon connecting the computer 2402 to an associated cloud storage system, the external storage interface 2426 can, with the aid of the adapter 2458 and/or modem 2460, manage storage provided by the cloud storage system as it would other types of external storage. For instance, the external storage interface 2426 can be configured to provide access to cloud storage sources as if those sources were physically connected to the computer 2402.

The computer 2402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 25:
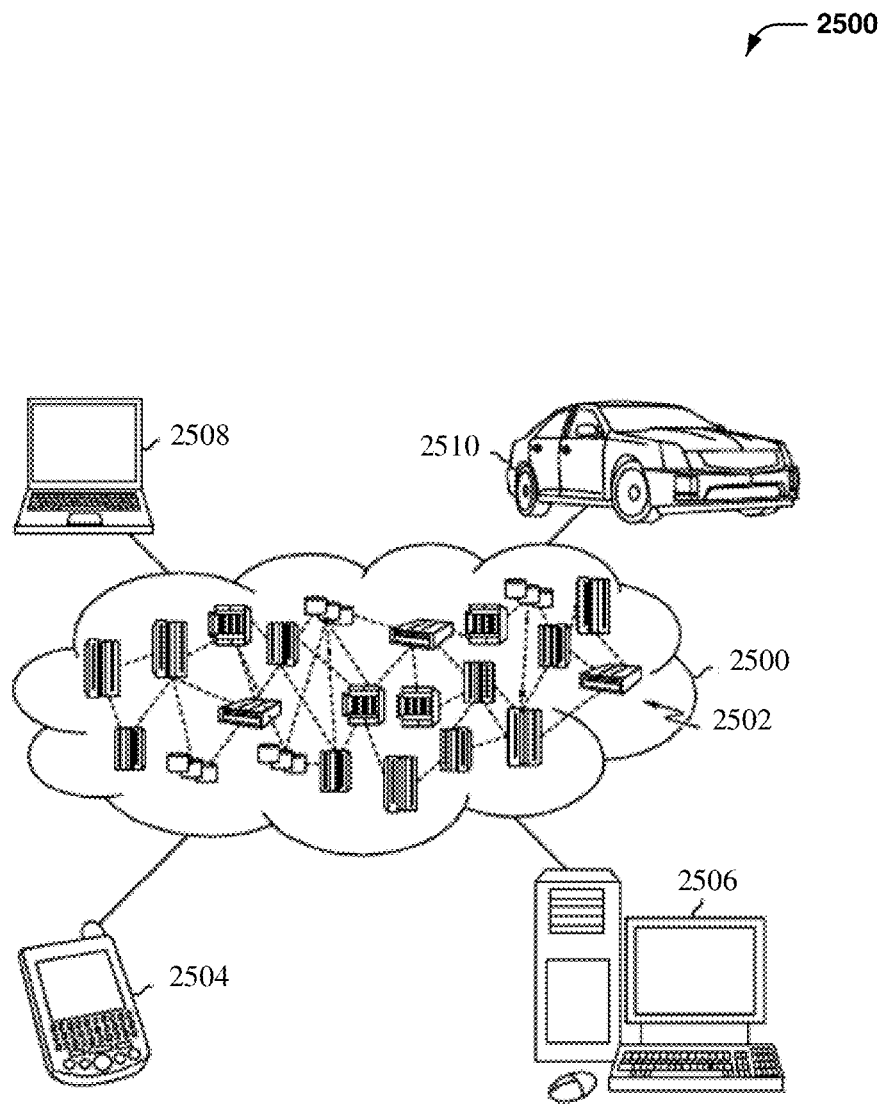
FIG. 25 illustrates an example, non-limiting cloud computing environment in accordance with one or more embodiments described herein.

Referring now to FIG. 25, illustrative cloud computing environment 2500 is depicted. As shown, cloud computing environment 2500 includes one or more cloud computing nodes 2502 with which local computing devices used by cloud consumers, such as, for example, personal digital assistant (PDA) or cellular telephone 2504, desktop computer 2506, laptop computer 2508, and/or automobile computer system 2510 may communicate. Nodes 2502 may communicate with one another. They may be grouped (not shown) physically or virtually, in one or more networks, such as Private, Community, Public, or Hybrid clouds as described hereinabove, or a combination thereof. This allows cloud computing environment 2500 to offer infrastructure, platforms and/or software as services for which a cloud consumer does not need to maintain resources on a local computing device. It is understood that the types of computing devices 2504-2510 shown in FIG. 25 are intended to be illustrative only and that computing nodes 2502 and cloud computing environment 2500 can communicate with any type of computerized device over any type of network and/or network addressable connection (e.g., using a web browser).

Figure 26:
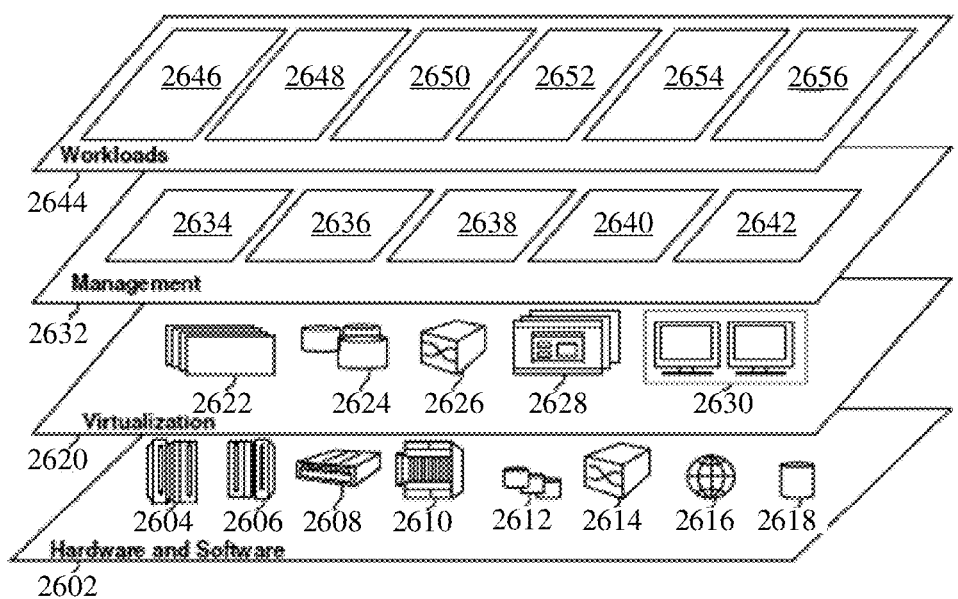
FIG. 26 illustrates example, non-limiting abstraction model layers in accordance with one or more embodiments described herein.

Referring now to FIG. 26, a set of functional abstraction layers provided by cloud computing environment 2500 (FIG. 25) is shown. Repetitive description of like elements employed in other embodiments described herein is omitted for sake of brevity. It should be understood in advance that the components, layers, and functions shown in FIG. 26 are intended to be illustrative only and embodiments of the invention are not limited thereto. As depicted, the following layers and corresponding functions are provided.

Hardware and software layer 2602 includes hardware and software components. Examples of hardware components include: mainframes 2604; RISC (Reduced Instruction Set Computer) architecture based servers 2606; servers 2608; blade servers 2610; storage devices 2612; and networks and networking components 2614. In some embodiments, software components include network application server software 2616 and database software 2618.

Virtualization layer 2620 provides an abstraction layer from which the following examples of virtual entities may be provided: virtual servers 2622; virtual storage 2624; virtual networks 2626, including virtual private networks; virtual applications and operating systems 2628; and virtual clients 2630.

In one example, management layer 2632 may provide the functions described below. Resource provisioning 2634 provides dynamic procurement of computing resources and other resources that are utilized to perform tasks within the cloud computing environment. Metering and Pricing 2636 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2638 provides access to the cloud computing environment for consumers and system administrators. Service level management 2640 provides cloud computing resource allocation and management such that required service levels are met. Service Level Agreement (SLA) planning and fulfillment 2642 provide pre-arrangement for, and procurement of, cloud computing resources for which a future requirement is anticipated in accordance with an SLA.

Workloads layer 2644 provides examples of functionality for which the cloud computing environment may be utilized. Examples of workloads and functions which may be provided from this layer include: mapping and navigation 2646; software development and lifecycle management 2648; virtual classroom education delivery 2650; data analytics processing 2652; transaction processing 2654; and differentially private federated learning processing 2656. Various embodiments of the present invention can utilize the cloud computing environment described with reference to FIGS. 25 and 26 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, and/or data structures, that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory configured to store computer-executable components; and
   a processor that executes at least one of the computer-executable components that:
      trains a neural network architecture to generate structured instruction manual documents from verbal conversations between human agents and human customers, wherein the neural network architecture comprises a first neural network, a second neural network, and a clustering algorithm, and wherein the training comprises:
         training, using a first training dataset comprising training human-to-human verbal conversation transcripts and respective training ground truth instruction manual chapters associated with the training human-to-human verbal conversation transcripts of the first training dataset, the first neural network to generate instruction manual chapters, and
         training, using a second training dataset comprising training clusters of instruction manual chapters and respective training ground truth structured instruction manual documents associated with the training clusters of instruction manual chapters of the second training dataset, the second neural network to generate the structured instruction manual documents from clusters of instruction manual chapters outputted from the first neural network and clustered by the clustering algorithm;
      accesses a group of human-to-human verbal conversation transcripts; and
      generates, via execution of the neural network architecture on the group of human-to-human verbal conversation transcripts, a structured instruction manual document.

2. The system of claim 1, wherein the generating the structured instruction manual document comprises:
   generating a set of document chapters by executing the first neural network respectively on the group of human-to-human verbal conversation transcripts.

3. The system of claim 2, wherein the generating the structured instruction manual document further comprises:
   grouping, via execution of the clustering algorithm using density-based clustering, the set of document chapters into one or more clusters of document chapters.

4. The system of claim 3, wherein the generating the structured instruction manual document further comprises:
   generates the structured instruction manual document by executing the second neural network on the one or more clusters of document chapters.

5. The system of claim 1, wherein the training further comprises training the first neural network, via backpropagation based on the first training dataset.

6. The system of claim 1, wherein the training further comprises training the second neural network via backpropagation based on the second training dataset.

7. The system of claim 1, wherein the training the first neural network employs reinforcement-learning fashion based on the second neural network.

8. The system of claim 1, wherein at least one of the first neural network or the second neural network is configured with advanced semantic embedding techniques for processing verbal conversation transcripts.

9. A computer-implemented method, comprising:

training, by a system comprising a processor, a neural network architecture to generate structured instruction manual documents from verbal conversations between human agents and human customers, wherein the neural network architecture comprises a first neural network, a second neural network, and a clustering algorithm, and wherein the training comprises:

training, using a first training dataset comprising training human-to-human verbal conversation transcripts and respective training ground truth instruction manual chapters associated with the training human-to-human verbal conversation transcripts of the first training dataset, the first neural network to generate instruction manual chapters, and training, using a second training dataset comprising clusters of instruction manual chapters and respective training ground truth structured instruction manual documents associated with the clusters of instruction manual chapters of the second training dataset, the second neural network to generate the structured instruction manual documents from clusters of instruction manual chapters outputted from the first neural network that have been clustered by the clustering algorithm;

accessing a group of human-to-human verbal conversation transcripts; and generating, via execution of the neural network architecture on the group of human-to-human verbal conversation transcripts, a structured instruction manual document.

10. The computer-implemented method of claim 9, wherein the generating the structured instruction manual document comprises:

generating a set of document chapters by executing the first neural network respectively on the group of human-to-human verbal conversation transcripts.

11. The computer-implemented method of claim 10, wherein the generating the structured instruction manual document further comprises:

grouping, via execution of the clustering algorithm, the set of document chapters into one or more clusters of document chapters.

12. The computer-implemented method of claim 11, wherein the generating the structured instruction manual document further comprises:

generating the structured instruction manual document by executing the second neural network on the one or more clusters of document chapters.

13. The computer-implemented method of claim 9, wherein the training further comprises training the first neural network, via backpropagation based on the first training dataset.

14. The computer-implemented method of claim 9, wherein the training further comprises training the second neural network via backpropagation based on the second training dataset.

15. The computer-implemented method of claim 9, wherein the training the first neural network employs reinforcement-learning fashion based on the second neural network.

16. The computer-implemented method of claim 9, wherein at least one of the first neural network or the second neural network is configured with advanced semantic embedding techniques for processing verbal conversation transcripts.

17. A computer program product for facilitating deep learning document generation from conversation transcripts, the computer program product comprising a non-transitory computer-readable memory having program instructions embodied therewith, the program instructions executable by a processor to cause the processor to:

train a neural network architecture to generate structured instruction manual documents from verbal conversations between human agents and human customers, wherein the neural network architecture comprises a first neural network, a second neural network, and a clustering algorithm, and wherein the training comprises:

training, using a first training dataset comprising training human-to-human verbal conversation transcripts and respective training ground truth instruction manual chapters associated with the training human-to-human verbal conversation transcripts of the first training dataset, the first neural network to generate instruction manual chapters, and training, using a second training dataset comprising training clusters of instruction manual chapters and respective training ground truth structured instruction manual documents associated with the training clusters of instruction manual chapters of the second training dataset, the second neural network to generate the structured instruction manual documents from clusters of instruction manual chapters outputted from the first neural network and clustered by the clustering algorithm;

access a group of human-to-human verbal conversation transcripts; and generate, via execution of the neural network architecture on the group of human-to-human verbal conversation transcripts, a structured instruction manual document.

18. The computer program product of claim 17, wherein the generating the structured instruction manual document comprises:

generating a set of document chapters by executing the first neural network respectively on the group of human-to-human verbal conversation transcripts.

19. The computer program product of claim 18, wherein the generating the structured instruction manual document further comprises :

grouping, via execution of the clustering algorithm, the set of document chapters into one or more clusters of document chapters.

20. The computer program product of claim 19, wherein the generating the structured instruction manual document further comprises:

generating the structured instruction manual document by executing the second neural network on the one or more clusters of document chapters.

* * * * *